(12) United States Patent
Mimori et al.

(10) Patent No.: US 7,636,290 B2
(45) Date of Patent: *Dec. 22, 2009

(54) OPTICAL ELEMENT, OPTICAL OBJECTIVE ELEMENT, AND OPTICAL PICKUP APPARATUS HAVING DIFFRACTIVE STRUCTURE AND OPTICAL DIFFERENCE GIVING STRUCTURE

(75) Inventors: Mitsuru Mimori, Hachioji (JP); Kouhei Ohta, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 10/666,518

(22) Filed: Sep. 19, 2003

(65) Prior Publication Data

US 2004/0062180 A1  Apr. 1, 2004

(30) Foreign Application Priority Data

| Sep. 30, 2002 | (JP) | ............................. 2002-287268 |
| Oct. 3, 2002 | (JP) | ............................. 2002-291399 |
| Nov. 7, 2002 | (JP) | ............................. 2002-323414 |
| Nov. 7, 2002 | (JP) | ............................. 2002-323418 |

(51) Int. Cl.
  *G11B 7/135* (2006.01)
(52) U.S. Cl. ............................. 369/112.08; 369/112.26; 359/569
(58) Field of Classification Search ............ 369/112.05, 369/112.08
  See application file for complete search history.

(56) References Cited

U.S. PATENT DOCUMENTS 5,202,775 A * 4/1993 Feldman et al. ............... 359/11

5,978,140 A * 11/1999 Maruyama ................... 359/569
6,118,594 A   9/2000 Maruyama (Continued)

FOREIGN PATENT DOCUMENTS

EP  0 610 055 A2  8/1994

(Continued)

OTHER PUBLICATIONS

G.J. Swanson, "Binary Optics Technology: The Theory and Design of Multi-level Diffractive Optical Elements", Technical Report, Massachusetts Institute of Technology Lincoln Laboratory, No. 854, Aug. 14, 1989.

*Primary Examiner*—Wayne R Young
*Assistant Examiner*—Van N Chow
(74) *Attorney, Agent, or Firm*—Cohen Pontani Lieberman & Pavane LLP

(57) ABSTRACT

An optical element comprises: a diffractive structure having a plurality of diffracting ring-shaped zones arranged around an optical axis on at least one optical surface; and an optical path difference giving structure arranged on an optical surface of at least one of the plurality of diffracting ring-shaped zones, for giving a prescribed optical path difference to a prescribed light beam passing through the diffracting ring-shaped zone, wherein the optical surface of the diffractive structure is a structure having a diffracting function for setting L-th (L≠0) order diffracted light of the light beam having the first wavelength λ1 to a maximum diffraction efficiency and for setting M-th (M≠0) order diffracted light of the light beam having the second wavelength λ2 to a maximum diffraction efficiency in case of an assumption of no existence of the optical path difference giving structure.

30 Claims, 15 Drawing Sheets

U.S. PATENT DOCUMENTS

| | | | |
|---|---|---|---|
| 6,134,055 A * | 10/2000 | Koike | 359/724 |
| 6,449,095 B1 | 9/2002 | Ohtaki et al. | |
| 6,462,874 B1 * | 10/2002 | Soskind | 359/565 |
| 6,552,990 B1 | 4/2003 | Kajiyama et al. | |
| 6,594,222 B2 * | 7/2003 | Maruyama | 369/112.26 |
| 6,667,821 B2 * | 12/2003 | Koreeda | 359/205 |
| 6,671,247 B1 * | 12/2003 | Arai et al. | 369/112.01 |
| 6,687,209 B2 * | 2/2004 | Ota et al. | 369/112.08 |
| 6,717,906 B1 * | 4/2004 | Shimano | 369/112.26 |
| 6,873,590 B2 * | 3/2005 | Takeuchi et al. | 369/112.08 |
| 7,031,076 B2 * | 4/2006 | Kimura et al. | 359/719 |
| 2001/0008512 A1 | 7/2001 | Maruyama | |
| 2003/0076595 A1 * | 4/2003 | Ikenaka et al. | 359/571 |
| 2004/0036972 A1 * | 2/2004 | Kimura et al. | 359/570 |
| 2005/0190679 A1 * | 9/2005 | Mimori | 369/112.05 |
| 2005/0201250 A1 * | 9/2005 | Mimori et al. | 369/112.01 |
| 2005/0281169 A1 * | 12/2005 | Kimura et al. | 369/112.01 |
| 2007/0177481 A1 * | 8/2007 | Kimura et al. | 369/112.01 |

FOREIGN PATENT DOCUMENTS

| | | |
|---|---|---|
| JP | 9-54973 | 2/1997 |
| JP | 9-306018 | 11/1997 |
| JP | 2000-56216 | 2/2000 |
| JP | 2001-81566 | 3/2000 |
| JP | 2001-93179 | 4/2001 |
| JP | 2001-249273 | 9/2001 |
| JP | 2002-50067 | 2/2002 |
| WO | WO 98/19303 | 5/1998 |
| WO | WO 02/21522 A1 | 3/2002 |

* cited by examiner

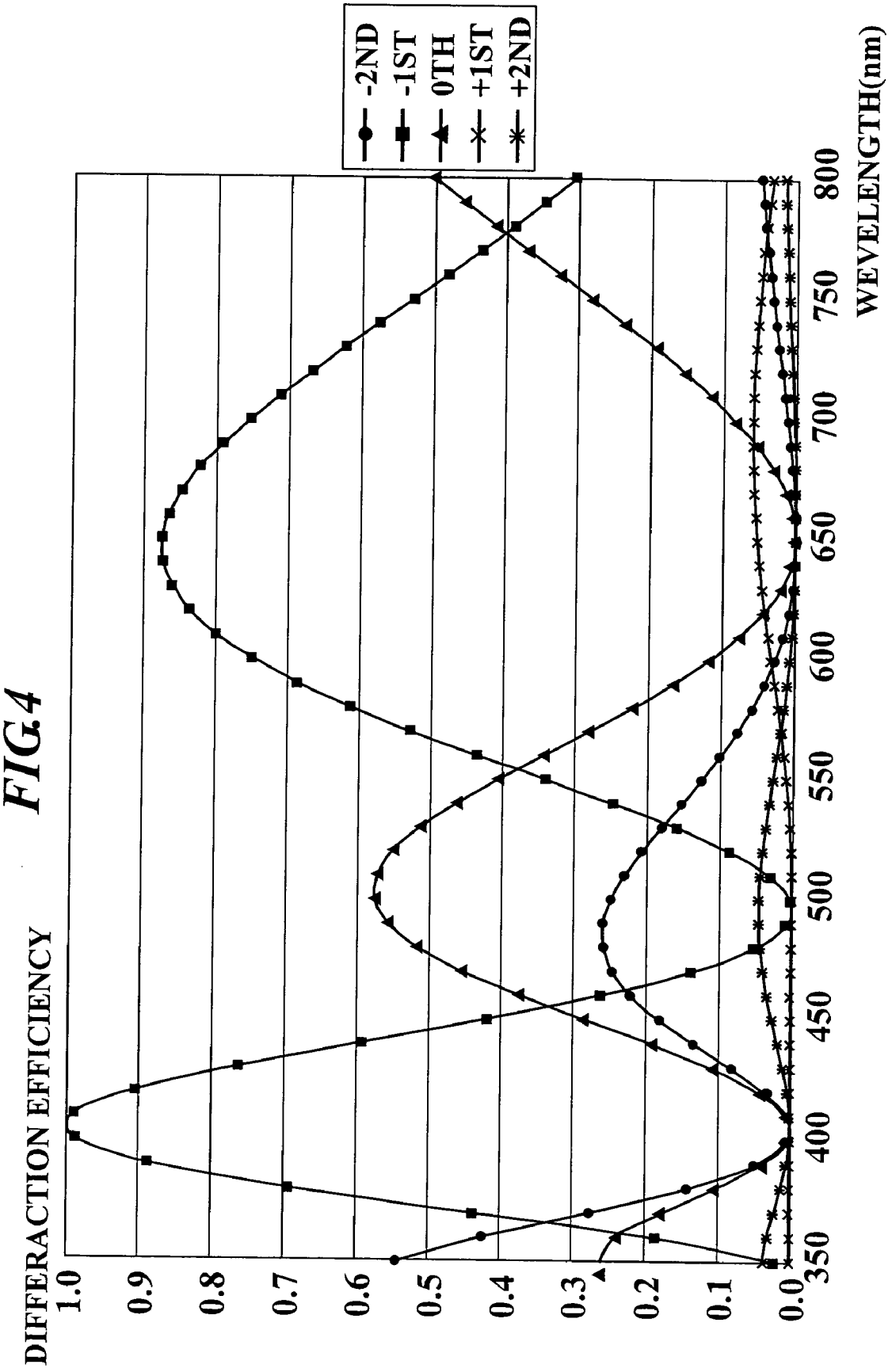

OPTICAL ELEMENT, OPTICAL OBJECTIVE ELEMENT, AND OPTICAL PICKUP APPARATUS HAVING DIFFRACTIVE STRUCTURE AND OPTICAL DIFFERENCE GIVING STRUCTURE

CROSS REFERENCE TO RELATED APPLICATIONS

This application claims priority to Japanese patent application 2002-287268 filed Sep. 30, 2002; Japanese patent application 2002-291399 filed Oct. 3, 2002; Japanese patent application 2002-323414 filed Nov. 7, 2002; and Japanese patent application 2002-323418 filed Nov. 7, 2002.

BACKGROUND OF THE INVENTION

1. Field of the Invention

The invention relates to an optical element, an objective optical element and an optical pickup device in which a light beam is converged on an information record plane of an optical information recording medium.

2. Description of Related Art

Recently, because a shorter wavelength red color laser has been practically used, a digital versatile disc (DVD) which is a large capacity and high intensity optical information recording medium (also called an optical disc) and has the approximately same size as a compact disc (CD), has been produced.

In a recording and reproducing device for the DVD, when a semiconductor laser for 650 nm wavelength light is used, a numerical aperture NA of an objective lens on the side of an optical disc is set within an range from 0.6 to 0.65. In the DVD, a track pitch of 0.74 μm and a shortest bit length of 0.4 μm are set to record data in high intensity as compared with the CD having the track pitch of 1.6 μm and the shortest bit length of 0.83 μm. Further, in the DVD, to suppress coma occurring when an optical disc is inclined with respect to an optical axis, the thickness of a protect substrate is set to 0.6 mm which is half of that of the CD.

Further, in addition to CD and DVD, various types of optical discs such as compact disc-recordable (CD-R), CD-rewritable (CD-RW), video disc (VD), mini disc (MD) and magneto-optical disc (MO) corresponding to different wavelengths of light emitted from light sources and different values of transparent substrates in thickness have been put on the market.

Moreover, the wavelength of light emitted from the semiconductor laser has been shortened. Therefore, a high intensity optical disc (hereinafter, called "high intensity DVD") having a protect substrate of a thickness of 0.1 mm and used with a blue-violet semiconductor laser emitting a light having a wavelength of about 400 nm and an objective lens of the heightened image-side numerical aperture of approximately 0.85 has been researched and developed. Further, a high intensity DVD having a protect substrate of a thickness of 0.6 mm and used with an objective lens of the heightened image-side numerical aperture of approximately 0.65 has been researched and developed.

Furthermore, various types of optical pickup devices respectively having an objective lens to converge light beams of different two wavelengths on each information record plane of two types of optical discs respectively, that is, the interchangeable optical pickup devices are proposed in Published Unexamined Japanese Patent Applications (Tokukaihei) No. 2001-93179 (first patent literature), No. 2000-81566 (second patent literature), No. H9-54973 (1997) (third patent literature), No. H9-306018 (1997) (fourth patent literature) and PCT International Publication No. 98/19303 (fifth patent literature).

In each of the first and second patent literatures, an optical pickup device having a diffraction optical element with a plurality of diffracting ring-shaped zones formed in a serrate shape in section is disclosed.

In this device, for example, a high diffraction efficiency is obtained by setting the blaze depth of the diffracting ring-shaped zone so as to heighten the diffraction efficiency of the diffracted light having a prescribed order for each of two light beams having different wavelengths, and the diffracted light is converged on a prescribed optical disc. Accordingly, the recording and reproduction of information is performed for two types of optical discs by using only one objective lens.

In the device disclosed in the first patent literature, each of the diffracted light beams having different diffraction orders, which are caused by diffracting two light beams having different wavelengths, is converged on the prescribed optical disc through the objective lens. Because the diffraction orders are determined according to the difference between the wavelengths, the combination of the diffraction orders is limited, and the correction of the axial achromatic aberration in each of the two types of optical discs and the correction of the spherical aberration caused by the change of temperature are limited.

Further, in the device disclosed in the second patent literature, each of the diffracted light beams having the same diffraction order, which are caused by diffracting two light beams having different wavelengths, is converged on the prescribed optical disc through the objective lens.

Diffraction efficiencies of diffracted light beams of diffraction orders ranging from minus second order to plus second order are shown in FIG. 8 in a wavelength range of light source from 350 nm to 800 nm when the diffracted light beams are obtained in a diffraction optical element disclosed in each of the first and second patent literatures and formed in a well-known serrate shape in section.

In this diffraction optical element, the diffraction efficiency of the −1st order diffracted light is set to approximately 100% in the wavelength of around 400 nm. Therefore, in the wavelength of around 650 nm used, for example, for the DVD, the diffraction efficiency of the −1st order diffracted light is lowered to a value ranging from 50% to 60%. In this case, when the diffraction optical element is used for two types of optical discs corresponding to wavelengths largely different from each other, a problem has arisen that an amount of light converged on one optical disc is insufficient.

The reason that the diffraction efficiency for a light beam having a wavelength other than a specific wavelength is lowered will be described. The size of the blaze of the diffraction optical element is set to give an optical path difference equal to the integral multiple of the specific wavelength to the light beam having the specific wavelength when the light beam having the specific wavelength passes through the blaze. Therefore, when a light beam having a wavelength other than the specific wavelength passes through the blaze of the diffraction optical element, an optical path difference not equal to the integral multiple of the wavelength of the light beam is given to the light beam. Therefore, the diffraction efficiency for the light beam is lowered.

In each of the third and fourth patent literatures, an optical pickup device having both a plane hologram optical device and a refraction type objective lens separated from each other is disclosed.

In this device, a light beam having one of two wavelengths is transmitted through the hologram optical device and is converged on a prescribed disc through the objective lens. Further, another light beam having the other wavelength is transmitted through the hologram optical device while being diffracted and diverging, and a −1st order diffracted light among various types of diffracted light is converged on the prescribed disc through the objective lens. Therefore, the recording and reproduction of information for two types of optical discs can be performed by using one objective lens.

Further, in the fifth patent literature, an optical pickup device having both an optical element and a refraction type objective lens separated from each other is disclosed. The optical element has both a hologram formed in a region (central region) arranged around the optical axis and a diffraction grating formed in the periphery (peripheral region) of the central region.

In this device, a light beam having the wavelength of 635 nm is transmitted through the central region, and a light beam having the wavelength of 780 nm is diffracted in the central region. Further, the light beam having the wavelength of 635 nm is transmitted through the peripheral region, and the light beam having the wavelength of 780 nm is diffracted in the peripheral region to substantially interrupt the light.

Therefore, all the light beam having the wavelength of 635 nm is incident on the objective lens, and a partial light beam having the wavelength of 780 nm and passing through the central region is diffracted while diverging and is incident on the objective lens. Accordingly, the recording and reproduction of information for two types of optical discs can be performed by using one objective lens.

However, in the devices disclosed in the third, fourth and fifth patent literatures, one light beam having one wavelength is diffracted in the hologram optical element, and the light beam is converged on the prescribed optical disc through the objective lens. The other light beam having the other wavelength is transmitted through the hologram optical element, and the light beam is converged on the prescribed optical disc through the objective lens.

Here, the diffraction efficiency is determined according to the number of steps of concave and convex portions formed on the hologram optical element. When the diffraction efficiency of the transmitted light approximately equals to 100%, the diffraction efficiency of the diffracted light is limited. For example, the diffraction efficiency equals to around 81% in the four-step structure, around 88% in the five-step structure and around 91% in the six-step structure. When the device is used for the recording of information, a problem has arisen that an amount of diffracted light is not sufficient. When the number of steps of the concave and convex portions in the hologram optical element is increased to increase the amount of diffracted light, a problem has arisen that it is difficult to make a metallic mold of the hologram optical element.

Further, in the devices disclosed in the third, fourth and fifth patent literatures, because the hologram optical element and the objective lens are separately arranged, a problem has arisen that a size of the device is inevitably enlarged.

Moreover, because the light beam is diffracted and diverges in the hologram optical element, an amount of light used for the recording and reproduction becomes low. Therefore, a problem has arisen that an amount of light converged on the optical disc is insufficient.

Furthermore, because the hologram optical element and the objective lens are positioned away from each other, the decentering is caused, or the image height characteristic is degraded. As a result, a problem has arisen that axial achromatic aberration occurs or spherical aberration (hereinafter, called "temperature characteristic aberration") occurs due to the change of temperature exceeding a changing degree expected in the design.

Still furthermore, because the hologram optical element formed on a flat plate is used, the number of concave and convex portions (interference fringe pattern) formed stepwise on the surface of the hologram optical element is increased. Therefore, a problem has arisen that the manufacturing of the hologram optical element is complicated.

SUMMARY OF THE INVENTION

In order to solve the above problem, an object of the present invention is to provide an optical element, an objective optical element and an optical pickup device which are used for the record and/or reproduction of information for two types of optical information recording media in which the thicknesses of the substrates are different from each other, and which can obtain a sufficiently high diffraction efficiency for two light beams of two wavelengths.

Another object of the present invention is to provide an optical element, an objective optical element and an optical pickup device which are used for the record and/or reproduction of information for two types of optical information recording media in which two use reference wavelengths are different from each other, and which can obtain the sufficient amount of light, suppress the deterioration of the image height characteristic and correct an axial chromatic aberration or a spherical aberration caused by a temperature change.

In order to accomplish the above-mentioned object, in accordance with the first aspect of the present invention, an optical element of an optical pickup device for reproducing and/or recording information for a first optical information recording medium having a protect substrate thickness t1 by using a light beam having a first wavelength $\lambda 1$ emitted from a first light source, and for reproducing and/or recording information for a second optical information recording medium having a protect substrate thickness t2 (t2$\geq$=t1) by using a light beam having a second wavelength $\lambda 2$ ($\lambda 2 > \lambda 1$) emitted from a second light source, comprises:

a diffractive structure having a plurality of diffracting ring-shaped zones arranged around an optical axis on at least one optical surface; and an optical path difference giving structure arranged on an optical surface of at least one of the plurality of diffracting ring-shaped zones, for giving a prescribed optical path difference to a prescribed light beam passing through the diffracting ring-shaped zone, wherein the optical surface of the diffractive structure is a structure having a diffracting function for setting L-th (L$\neq$0) order diffracted light of the light beam having the first wavelength $\lambda 1$ to a maximum diffraction efficiency and for setting M-th (M$\neq$0) order diffracted light of the light beam having the second wavelength $\lambda 2$ to a maximum diffraction efficiency in case of an assumption of no existence of the optical path difference giving structure.

The optical element in this specification denotes a constituent element of the optical pickup device such as an objective lens (objective optical element), a coupling lens (collimator), a beam expander, a beam shaper, a correcting plate or the like.

The optical element is not limited to a single lens, and a lens group configured by combining a plurality of lenses aligned in the direction of the optical axis can be adopted as the optical element.

The objective lens denotes, in a narrow sense, a lens which has a converging function and is placed at a position nearest to the optical information recording medium so as to be opposite to the optical information recording medium in a condition that the optical information recording medium is arranged in the optical pickup device. In a wide sense, the objective lens denotes a lens which is movable at least in the direction of the optical axis by an actuator, in addition to the lens of the narrow sense.

The optical information recording medium denotes a general optical disc, such as CD, DVD, CD-R, MD, MO, high density DVD or the like, for reproducing and/or recording information by using a light beam of a prescribed wavelength.

The reproduction of information denotes the reproduction of information recorded in an information recording plane of the optical information recording medium. The recording of information denotes the recording of information to the information recording plane of the optical information recording medium. Here, the reproduction includes the merely reading-out of information.

The optical element and the optical pickup device according to the present invention may be used to either record or reproduce information or used to both record and reproduce information.

The diffracting ring-shaped zone formed on the optical surface denotes a periodic structure in which a plurality of ring-shaped zones arranged around the optical axis are concentrically arranged on the surface of the optical element so as to have a diffracting function for the incident light beam.

The structure having a diffracting function according to the present invention denotes a structure which has a function of diffracting an incident light beam and is formed in a serrate shape or a stepped shape or the like along the direction of the optical axis when a cross-sectional plane (meridian cross-sectional plane) of the structure including the optical axis is seen.

It is not required to form the diffracting ring-shaped zone on the whole optical surface. For example, the diffracting ring-shaped zone may be formed in a prescribed area arranged around the optical axis.

The diffracting ring-shaped zone may be formed on one optical surface of one optical element or at least one of a plurality of optical surfaces of one optical element.

Therefore, for example, the diffracting ring-shaped zone may be formed on the optical surface on the light source side or on the optical surface on the optical information recording medium. Further, the diffracting ring-shaped zone may be formed on a plurality of optical surfaces of the optical elements composing the optical pickup device, for example, on each optical surface.

To substantially give no change of phase in the present invention is not limited to a case of no change of phase, but denotes a change within a range (around ±0.2π radian) that a phase change does not considerably influence on the diffraction efficiency.

An infinite number of orders of diffracted lights such as 0th order diffracted light, ±1st order diffracted light, ±2nd order diffracted light, . . . are generally caused by the optical surface having the diffracting ring-shaped zones. However, when the shape of the diffracting ring-shaped zones is changed, the diffraction efficiency of the diffracted light of a diffraction order can be set to be higher than that of another diffraction order, and the diffraction efficiency of the diffracted light of one specific diffraction order (for example, +1st order diffracted light) can be set to approximately 100%.

The diffraction efficiency denotes a ratio of an amount of one diffracted light caused by the diffracting ring-shaped zone, and the sum of diffraction efficiencies of all diffracted lights is equal to 1.

The L-th (or M-th) order diffracted light having the maximum diffraction efficiency denotes the L-th (or M-th) order diffracted light in which the diffraction efficiency is theoretically highest among diffraction efficiencies of all diffracted lights when the light beam having the wavelength $\lambda 1$ (or $\lambda 2$) is incident on the optical element.

In this specification, the protect substrate denotes an optically transparent parallel plate arranged on the light beam incident surface side of the information recording plane to protect the information recording plane of the optical information recording medium. The protect substrate thickness denotes a thickness of the parallel plate. The light beam emitted from the light source is converged by the objective lens on the information recording plane of the optical information recording medium through the protect substrate.

In this specification, the numerical aperture of the optical element on the image side denotes a numerical aperture of a lens surface placed nearest to the optical information recording medium among surfaces of the optical element.

The numerical aperture denotes a numerical aperture defined by limiting a light beam contributing the formation of a spot at a best image point due to parts or members having a stop function, such as a stop, a filter of the optical pickup device or the like, or due to the diffracting ring-shaped zone of the optical element.

The use reference wavelength denotes a wavelength of the light beam emitted from a light source at a use reference temperature.

The use reference temperature denotes an ordinary temperature (around 10 to 40° C.) in a temperature change range of the environment in which the objective optical element and the optical pickup device are used.

The optical surface formed in the prescribed aspherical shape denotes an optical surface composing virtual aspherical shapes obtained by connecting start points of the diffracting ring-shaped zones.

The optical surface substantially inclined with respect to the optical surface formed in the prescribed aspherical shape denotes an optical surface composing a diffracting ring-shaped zone structure which is formed, for example, in a serrate shape or in a stepped shape extending in the direction of the optical axis when a cross-sectional plane (meridian cross-sectional plane) of the optical surface including the optical axis is seen.

Preferably, as compared with the assumption of no existence of the optical path difference giving structure, the optical path difference giving structure lowers an absolute value of an optical phase difference between the L-th order diffracted light of the light beam having the first wavelength $\lambda 1$ and the M-th order diffracted light of the light beam having the second wavelength $\lambda 2$ by changing a phase of at least one of the L-th order diffracted light of the light beam having the first wavelength $\lambda 1$ and the M-th order diffracted light of the light beam having the second wavelength $\lambda 2$, the L-th order diffracted light and the M-th order diffracted light being caused by the structure having the diffracting function.

In the present invention, the optical element comprises a diffractive structure having a plurality of diffracting ring-shaped zones arranged around an optical axis on at least one optical surface; and an optical path difference giving structure arranged on an optical surface of at least one of the plurality of diffracting ring-shaped zones, for giving a prescribed optical path difference to a prescribed light beam passing through the diffracting ring-shaped zone.

Further, the L-th order diffracted light having a maximum diffraction efficiency and the M-th order diffracted light having a maximum diffraction efficiency are caused by the structure having the diffracting function and the phase of at least one of the L-th order diffracted light of the light beam having the first wavelength λ1 and the M-th order diffracted light of the light beam having the second wavelength λ2, is changed. Therefore, as compared with the assumption of no existence of the optical path difference giving structure, the optical path difference giving structure lowers an absolute value of the optical phase difference between the L-th order diffracted light of the light beam having the first wavelength λ1 and the M-th order diffracted light of the light beam having the second wavelength λ2.

Accordingly, the L-th order diffracted light of the light beam having the first wavelength λ1 and the M-th order diffracted light of the light beam having the second wavelength λ2 can emerge in a condition of the high diffraction efficiency.

Preferably, as compared with the assumption of no existence of the optical path difference giving structure, the optical path difference giving structure lowers an absolute value of an optical phase difference between the L-th order diffracted light of the light beam having the first wavelength λ1 and the M-th order diffracted light of the light beam having the second wavelength λ2 by substantially giving no change of a phase of one of the L-th order diffracted light of the light beam having the first wavelength λ1 and the M-th order diffracted light of the light beam having the second wavelength λ2 and by giving a phase difference to the other of the L-th order diffracted light of the light beam having the first wavelength λ1 and the M-th order diffracted light having the light beam having the second wavelength λ2, the L-th order diffracted light and the M-th order diffracted light being caused by the structure having the diffracting function.

In this invention, further, the change of the phase is not substantially given to the L-th order diffracted light of the light beam having the first wavelength λ1, and is given to the M-th order diffracted light of the light beam having the second wavelength λ2. Therefore, the L-th order diffracted light of the light beam having the first wavelength λ1 can emerge to the first optical information recording medium while holding the maximum diffraction efficiency, and the M-th order diffracted light of the light beam having the second wavelength λ2 can emerge to the second optical information recording medium at the diffraction efficiency higher than that in a case of the assumption of no optical path difference giving structure.

Preferably, as compared with the assumption of no optical path difference giving structure, the optical path difference giving structure lowers an absolute value of an optical phase difference between the L-th order diffracted light of the light beam having the first wavelength λ1 and the M-th order diffracted light of the light beam having the second wavelength λ2 by giving a phase difference to both the L-th order diffracted light of the light beam having the first wavelength λ1 and the M-th order diffracted light of the light beam having the second wavelength λ2, the L-th order diffracted light and the M-th order diffracted light being caused by the structure having the diffracting function.

In this invention, further, the L-th order diffracted light and the M-th order diffracted light are caused by the structure having the diffracting function and the optical path difference giving structure gives the phase difference to both the L-th order diffracted light of the light beam having the first wavelength λ1 and the M-th order diffracted light of the light beam having the second wavelength λ2. Therefore, as compared with the assumption of no optical path difference giving structure, both the L-th order diffracted light of the light beam having the first wavelength λ1 and the M-th order diffracted light of the light beam having the second wavelength λ2 can emerge to the first optical information recording medium and the second optical information recording medium respectively in a condition of the high diffraction efficiency.

Preferably, as compared with the assumption of no optical path difference giving structure, the optical path difference giving structure lowers an absolute value of an optical phase difference between the L-th order diffracted light of the light beam having the first wavelength λ1 and the M-th order diffracted light of the light beam having the second wavelength λ2 by giving an optical path difference approximately equal to an integral multiple having the first wavelength λ1 to the L-th order diffracted light of the light beam having the first wavelength λ1 to substantially give no change of a phase difference generated by the diffractive structure and by giving an optical path difference not equal to an integral multiple having the second wavelength λ2 to the M-th order diffracted light of the light beam having the second wavelength λ2.

In this invention, the same effects as above-described preferable case can be obtained.

Preferably, the optical path difference giving structure sets the absolute value of the optical phase difference to a value lower than 0.6π radians.

Preferably, the structure having the diffracting function has a discontinuous surface formed in a serrate shape, and the optical path difference giving structure has a discontinuous surface formed in a stepped shape along a direction of the optical axis.

Preferably, the structure having the diffracting function has a discontinuous surface formed in a stepped shape along a direction of the optical axis, and the optical path difference giving structure has a discontinuous surface formed in a stepped shape along the direction of the optical axis.

Preferably, the optical surface comprises a central region arranged around the optical axis and formed in an approximately circular shape, and a peripheral region arranged at a periphery of the central region, the structure having the diffracting function and the optical path difference giving structure are provided in the central region, and the diffractive structure formed in a serrate shape is provided in the peripheral region.

Preferably, the optical surface comprises a central region arranged around the optical axis and formed in an approximately circular shape, and a peripheral region arranged at a periphery of the central region, the structure having the diffracting function and the optical path difference giving structure are provided in the central region, and the optical path difference giving structure is provided in the peripheral region.

Preferably, the optical surface comprises a central region arranged around the optical axis and formed in an approximately circular shape, and a peripheral region arranged at a periphery of the central region, the structure having the diffracting function and the optical path difference giving structure are provided in the central region, and a refractive structure for refracting a light beam is arranged in the peripheral region.

In the three preferable cases described above, the same effects as above-described effects can be obtained. Further, when the incident light beam passes through either the central region or the peripheral region or both the central region and the peripheral region in case of necessity, the degree of freedom in the design for the diffraction efficiency and the diffraction order can be further increased. Moreover, various types of aberration can be easily corrected.

Preferably, L=M is satisfied.

Preferably, L=M=1 is satisfied.

Preferably, the number of the discontinuous surfaces which are formed in a stepped shape along a direction of the optical axis and composes the optical path difference giving structure, is 2 or 3.

Preferably, the first wavelength λ1 satisfies 370 nm≦λ1≦430 nm, and the second wavelength λ2 satisfies 620 nm≦λ2≦680 nm.

Preferably, the structure having the diffracting function sets a sum of a diffraction efficiency of the L-th order diffracted light of the light beam having the first wavelength λ1 and a diffraction efficiency of the M-th order diffracted light of the light beam having the second wavelength λ2 to 170% or less, and the optical path difference giving structure heightens the sum of the diffraction efficiency of the L-th order diffracted light of the light beam having the first wavelength λ1 and the diffraction efficiency of the M-th order diffracted light of the light beam having the second wavelength λ2 by 10% or more.

Preferably, the above-described optical element is the objective optical element wherein the light beam having the first wavelength λ1 and the light beam having the second wavelength λ2 are respectively incident on the optical surface as a diverging light beam, and the light beam having the first wavelength λ1 and the light beam having the second wavelength λ2 are converged on a prescribed optical information recording medium in a condition that spherical aberration and/or wave front aberration are corrected.

In this invention, the same effects as above-described effect can be obtained. Further, when the light beam having the first wavelength λ1 and the light beam having the second wavelength λ2 are respectively incident on the optical surface as a diverging light beam, the light beams are converged on the prescribed optical information recording medium in the condition that spherical aberration and/or wave front aberration in the light beams are corrected.

Therefore, an optical element such as a collimator lens which is used in a infinite type of optical pickup device to collimate a light beam emitted from a light source and to transmit the light beam to an objective optical element, is not required. Further, the device can be miniaturized and can be manufactured at a low cost.

Here, it is desirable that the objective optical element converges the light beam in a condition that the wave front aberration is set to be equal to or lower than 0.05 λrms.

Preferably, magnification m satisfies a formula:

$-0.295 \leq m \leq -0.049.$

In this invention, the same effects as those in the preferable case described above can be obtained.

Generally, when the distance from the light source to the objective optical element is long, the loss in an amount of light is larger. Therefore, it is desired that the magnification m is set to be as small as possible. In contrast, when the magnification m is excessively small, an amount of aberration occurring due to a change in temperature or tracking becomes large. Therefore, by setting the magnification m within the range of the formula, both a sufficient amount of light and the suppression of the aberration can be achieved.

Moreover, because no coupling lens is required, the number of parts of the optical pickup device can be reduced, and the occurrence of various types of aberration due to the attaching error of a coupling lens can be prevented.

More preferably, a magnification m satisfies a formula −0.148≦m≦−0.117.

Preferably, a curvature radius R1 of a paraxial region of an optical surface on a light source side and a curvature radius R2 of a paraxial region of an optical surface on the optical information recording medium side satisfies a formula:

$-3.2 < R2/R1 < -1.9.$

Preferably, the first wavelength λ1 and the second wavelength λ2 are a use reference wavelength.

Preferably, the above-described optical element is an objective optical element, wherein the optical path difference giving structure gives an optical path difference to the diffracted light so that a −N-th order diffracted light of the light beam having the use reference wavelength λ1 has a maximum diffraction efficiency and so that a (−N+1)-th order diffracted light of the light beam having the use reference wavelength λ2 or a (−N−1)-th order diffracted light of the light beam having the use reference wavelength λ2 has a maximum diffraction efficiency.

In this invention, the optical path difference giving structure gives an optical path difference to the diffracted light so that a −N-th order diffracted light of the light beam having the use reference wavelength λ1 has a maximum diffraction efficiency and so that a (−N+1)-th order diffracted light of the light beam having the use reference wavelength λ2 or a (−N−1)-th order diffracted light of the light beam having the use reference wavelength λ2 has a maximum diffraction efficiency.

Therefore, diffracted light equivalent to the (L−N)-th order diffracted light of the light beam having the use reference wavelength λ1 emerges to the first optical information recording medium, and diffracted light equivalent to the (M−N+1)-th order diffracted light or the (M−N−1)-th order diffracted light of the light beam having the use reference wavelength λ2 emerges to the second optical information recording medium.

As described above, because the diffraction order of the light beam having each wavelength can be substantially changed by two stages of the diffracting ring-shaped zones of the objective optical element and the optical path difference giving structure, diffracted light having a sufficient amount of light corresponding to each type of the optical information recording medium can be obtained by appropriately changing the diffraction order of each light beam. Further, the degree of freedom in the design for the diffraction efficiency or the diffraction order can be increased.

In the conventional optical pickup device, diffracted light is obtained from a light beam having a prescribed wavelength by using a diffraction optical element. In contrast, in the diffraction optical element of the present invention, diffracted light is obtained by the diffracting ring-shaped zones. Because the reproduction and/or recording of information for the optical information recording medium is performed by using the (L−N)-th order diffracted light having the maximum diffraction efficiency in the light beam having the use reference wavelength λ1 and the (M−N+1)-th order diffracted light or the (M−N−1)-th order diffracted light having the maximum diffraction efficiency in the light beam having the use reference wavelength λ2, diffracted light having a sufficient amount of light corresponding to a type of the optical information recording medium can be obtained by appropriately changing the diffraction order of each light beam.

Further, because the diffracted light is used for the reproduction and/or recording of information for the optical information recording medium, various types of aberration (axial chromatic aberration and temperature characteristic types aberration) can be corrected with high accuracy.

The plurality of diffracting ring-shaped zones formed on the optical surface of a prescribed aspherical shape and arranged around the optical axis are arranged, and the optical path difference giving structure is arranged on the optical surface of at least one of the diffracting ring-shaped zones.

Therefore, as compared with a case that an optical element having the diffracting ring-shaped zones and an optical element such as a hologram optical element having an optical path difference giving structure are separately arranged, the optical pickup device can be miniaturized, and center-shifting and the deterioration of an image height characteristic can be prevented.

Further, as compared with a case that a stepwise discontinuous plane is formed on a plane perpendicular to the optical axis like a hologram optical element formed in a plane plate shape, the total number of steps of the discontinuous surface or the number of diffracting ring-shaped zones can be reduced, and the number of manufacturing steps can be reduced.

Preferably, the optical surface of the diffracting ring-shaped zone has a structure substantially inclined with respect to the optical surface formed in a prescribed aspherical shape, the structure substantially inclined having a discontinuous surface formed in a serrate shape, and the optical path difference giving structure has a discontinuous surface formed in a stepped shape along the direction of the optical axis.

Preferably, the optical surface of the diffracting ring-shaped zone has a structure substantially inclined with respect to the optical surface formed in a prescribed aspherical shape, the structure substantially inclined having a discontinuous surface formed in a stepped shape along the direction of the optical axis, and the optical path difference giving structure has a discontinuous surface formed in a stepped shape along the direction of the optical axis.

Preferably, the optical surface formed in the prescribed aspherical shape is partitioned into a central region arranged around the optical axis and formed in an approximately circular shape, and a peripheral region surrounding a periphery of the central region, the diffracting ring-shaped zones are arranged in the central region, and a diffracting ring-shaped zone formed in the serrate shape is arranged in the peripheral region.

Preferably, the optical surface formed in the prescribed aspherical shape is partitioned into a central region arranged around the optical axis and formed in an approximately circular shape, and a peripheral region surrounding a periphery of the central region, the diffracting ring-shaped zones are arranged in the central region, and the optical path difference giving structure is arranged in the peripheral region.

Preferably, the optical surface formed in the prescribed aspherical shape is partitioned into a central region arranged around the optical axis and formed in an approximately circular shape, and a peripheral region surrounding a periphery of the central region, the diffracting ring-shaped zones are arranged in the central region, and a refractive structure for reflecting the light beam is arranged in the peripheral region.

In the three preferable cases described above, the same effects as those in the other preferable cases can be obtained. Further, when the incident light beam passes though only the central region or the peripheral region or both the central region and the peripheral region in case of necessity, the degree of freedom in design for the diffraction efficiency or the diffraction order can be increased.

Preferably, the number of diffracting ring-shaped zones is from 3 to 20.

Preferably, the optical path difference giving structure gives an optical path difference equal to an integral multiple of the use reference wavelength $\lambda 2$ to the light beam having the use reference wavelength $\lambda 2$.

The same effects as the above-described case can be obtained. Further, an optical path difference equal to an integral multiple of the use reference wavelength $\lambda 2$ is given to the light beam having the use reference wavelength $\lambda 2$ from the optical path difference giving structure. In other words, no optical path difference is substantially given to the light beam having the use reference wavelength $\lambda 2$ by the optical path difference giving structure. Therefore, the M-th order diffracted light of the light beam having the use reference wavelength $\lambda 2$, which is diffracted by the diffracting ring-shaped zones and has the maximum diffraction efficiency can emerge to the second optical information recording medium as the light beam equivalent to the M-th order diffracted light.

Preferably, L=M is satisfied.
Preferably, L=N is satisfied.
Preferably, M=N is satisfied.
Preferably, L=M=N is satisfied.

Preferably, the light beam having the use reference wavelength $\lambda 1$ and the light beam having the use reference wavelength $\lambda 2$ are respectively incident on the optical surface as a diverging light beam, and the light beam having the use reference wavelength $\lambda 1$ and the light beam having the use reference wavelength $\lambda 2$ are converged on a prescribed optical information recording medium in a condition that spherical aberration and/or wave front aberration are corrected.

In the invention, the same effects as the above-described case can be obtained. Further, when the light beam having the use reference wavelength $\lambda 1$ and the light beam having the use reference wavelength $\lambda 2$ are respectively incident on the objective optical element as a diverging light beam, the light beams can be converted on an prescribed optical information recording medium in a condition that spherical aberration and/or wave front aberration in the light beams are corrected.

Therefore, an optical element such as a collimator lens which is used in a infinite type of optical pickup device to collimate a light beam emitted from a light source and to transmit the light beam to an objective optical element, is not required. Further, the device can be miniaturized and can be manufactured at a low cost.

Here, it is desirable that the objective optical element converges the light beam in a condition that the wave front aberration is set to be equal to or lower than 0.05 $\lambda$rms.

Preferably, a magnification m satisfies a formula;

$$-0.295 \leq m \leq -0.049.$$

The same effects as those obtained in the above-described invention can be obtained.

Generally, when the distance from the light source to the objective optical element is long, the loss in an amount of light is larger. Therefore, it is desired that the magnification m is set to be as small as possible. In contrast, when the magnification m is excessively small, an amount of aberration occurring due to a change in temperature or tracking becomes large. Therefore, by setting the magnification m within the range of the formula, both a sufficient amount of light and the suppression of the aberration can be achieved.

Moreover, because no coupling lens is required, the number of parts of the optical pickup device can be reduced, and the occurrence of various types of aberration due to the attaching error of a coupling lens can be prevented.

More preferably, a magnification m satisfies a formula $-0.148 \leq m \leq -0.117$.

Preferably, a curvature radius R1 of a paraxial region of an optical surface on a light source side and a curvature radius R2 of a paraxial region of an optical surface on the optical information recording medium side satisfies a formula:

$$-3.2 < R2/R1 < -1.9.$$

In accordance with the second aspect of the present invention, an optical pickup device for reproducing and/or recording information for a first optical information recording medium having a protect substrate thickness t1 by using a light beam having a first wavelength $\lambda 1$ emitted from a first light source, and for reproducing and/or recording information for a second optical information recording medium having a protect substrate thickness t2 ($t2 \geq t1$) by using a light beam having a second wavelength $\lambda 2$ ($\lambda 2 > \lambda 1$) emitted from a second light source, the optical pickup device comprises:

a plurality of optical elements;

wherein at least one of the optical elements comprises a diffractive structure having a plurality of diffracting ring-shaped zones arranged around an optical axis on at least an optical surface; and an optical path difference giving structure arranged on an optical surface of at least one of the plurality of diffracting ring-shaped zones, for giving a prescribed optical path difference to a prescribed light beam passing through the diffracting ring-shaped zone, wherein the optical surface of the diffractive structure is a structure having a diffracting function for setting L-th ($L \neq 0$) order diffracted light of the light beam having the first wavelength $\lambda 1$ to a maximum diffraction efficiency and for setting M-th ($M \neq 0$) order diffracted light of the light beam having the second wavelength $\lambda 2$ to a maximum diffraction efficiency in case of an assumption of no existence of the optical path difference giving structure.

Preferably, as compared with the assumption of no existence of the optical path difference giving structure, the optical path difference giving structure lowers an absolute value of an optical phase difference between the L-th order diffracted light of the light beam having the first wavelength $\lambda 1$ and the M-th order diffracted light of the light beam having the second wavelength $\lambda 2$ by changing a phase of at least one of the L-th order diffracted light of the light beam having the first wavelength $\lambda 1$ and the M-th order diffracted light of the light beam having the second wavelength $\lambda 2$, the L-th order diffracted light and the M-th order diffracted light being caused by the structure having the diffracting function.

In the invention, at least one of the optical elements comprises a diffractive structure having a plurality of diffracting ring-shaped zones arranged around an optical axis on at least an optical surface; and an optical path difference giving structure arranged on an optical surface of at least one of the plurality of diffracting ring-shaped zones, for giving a prescribed optical path difference to a prescribed light beam passing through the diffracting ring-shaped zone.

Further, the L-th order diffracted light having a maximum diffraction efficiency and the M-th order diffracted light having a maximum diffraction efficiency are caused by the structure having the diffracting function and the phase of at least one of the L-th order diffracted light of the light beam having the first wavelength $\lambda 1$ and the M-th order diffracted light of the light beam having the second wavelength $\lambda 2$, is changed. Therefore, as compared with the assumption of no existence of the optical path difference giving structure, the optical path difference giving structure lowers an absolute value of the optical phase difference between the L-th order diffracted light of the light beam having the first wavelength $\lambda 1$ and the M-th order diffracted light of the light beam having the second wavelength $\lambda 2$.

Accordingly, the L-th order diffracted light of the light beam having the first wavelength $\lambda 1$ and the M-th order diffracted light of the light beam having the second wavelength $\lambda 2$ can emerge in a condition of the high diffraction efficiency.

Preferably, one of the optical elements is an objective optical element, and the light beam having the first wavelength $\lambda 1$ and the light beam having the second wavelength $\lambda 2$ are respectively incident on the objective optical element as a diverging light beam, and the light beam having the first wavelength $\lambda 1$ and the light beam having the second wavelength $\lambda 2$ are converged on a prescribed optical information recording medium in a condition that spherical aberration and/or wave front aberration are corrected.

In this invention, the same effects as above-described effect can be obtained. Further, when the light beam having the first wavelength $\lambda 1$ and the light beam having the second wavelength $\lambda 2$ are respectively incident on the optical surface as a diverging light beam, the light beams are converged on the prescribed optical information recording medium in the condition that spherical aberration and/or wave front aberration in the light beams are corrected.

Therefore, an optical element such as a collimator lens which is used in a infinite type of optical pickup device to collimate a light beam emitted from a light source and to transmit the light beam to an objective optical element, is not required. Further, the device can be miniaturized and can be manufactured at a low cost.

Here, it is desirable that the objective optical element converges the light beam in a condition that the wave front aberration is set to be equal to or lower than 0.05 $\lambda$rms.

Preferably, a magnification m satisfies a formula:

$$-0.295 \leq m \leq -0.049.$$

In this invention, the same effects as the above case, and the sufficient amount of light and the suppression of the aberration can be simultaneously achieved.

Moreover, because no coupling lens is required, the number of parts of the optical pickup device can be reduced, and the occurrence of various types of aberration due to the attaching error of a coupling lens can be prevented.

More preferably, a magnification m satisfies a formula $-0.148 \leq m \leq -0.117$.

Preferably, information is reproduced and/or recorded for a third optical information recording medium having a protect substrate thickness t3 (t3>t2) by using a light beam having a third wavelength $\lambda 3$ ($\lambda 3 > \lambda 2$) emitted from a third light source.

Preferably, the first wavelength $\lambda 1$ and the second wavelength $\lambda 2$ are a use reference wavelength.

Preferably, the optical path difference giving structure gives an optical path difference to the diffracted light so that a -N-th order diffracted light of the light beam having the use reference wavelength $\lambda 1$ has a maximum diffraction efficiency and so that a (-N+1)-th order diffracted light of the light beam having the use reference wavelength λ2 or a (−N−1)-th order diffracted light of the light beam having the use reference wavelength λ2 has a maximum diffraction efficiency.

In this invention, the optical path difference giving structure gives an optical path difference to the diffracted light so that a −N-th order diffracted light of the light beam having the use reference wavelength λ1 has a maximum diffraction efficiency and so that a (−N+1)-th order diffracted light of the light beam having the use reference wavelength λ2 or a (−N−1)-th order diffracted light of the light beam having the use reference wavelength λ2 has a maximum diffraction efficiency.

Therefore, diffracted light equivalent to the (L−N)-th order diffracted light of the light beam having the use reference wavelength λ1 emerges to the first optical information recording medium, and diffracted light equivalent to the (M−N+1)-th order diffracted light or the (M−N−1)-th order diffracted light of the light beam having the use reference wavelength λ2 emerges to the second optical information recording medium.

As described above, because the diffraction order of the light beam having each wavelength can be substantially changed by two stages of the diffracting ring-shaped zones of the objective optical element and the optical path difference giving structure, diffracted light having a sufficient amount of light corresponding to each type of the optical information recording medium can be obtained by appropriately changing the diffraction order of each light beam. Further, the degree of freedom in the design for the diffraction efficiency or the diffraction order can be increased.

Preferably, the light beam having the first wavelength λ1 and the light beam having the second wavelength λ2 are respectively incident on the objective optical element as a diverging light beam, and the light beam having the first wavelength λ1 and the light beam having the second wavelength λ2 are converged on a prescribed optical information recording medium in a condition that spherical aberration and/or wave front aberration are corrected.

In the invention, the same effects as the above-described case can be obtained. Further, when the light beam having the use reference wavelength λ1 and the light beam having the use reference wavelength λ2 are respectively incident on the objective optical element as a diverging light beam, the light beams can be converted on an prescribed optical information recording medium in a condition that spherical aberration and/or wave front aberration in the light beams are corrected.

Therefore, an optical element such as a collimator lens which is used in a infinite type of optical pickup device to collimate a light beam emitted from a light source and to transmit the light beam to an objective optical element, is not required. Further, the device can be miniaturized and can be manufactured at a low cost.

Here, it is desirable that the objective optical element converges the light beam in a condition that the wave front aberration is set to be equal to or lower than 0.05 λrms.

Preferably, a magnification m satisfies a formula:

$-0.295 \leq m \leq -0.049$.

In this invention, the same effects as the above case, and the sufficient amount of light and the suppression of the aberration can be simultaneously achieved.

Moreover, because no coupling lens is required, the number of parts of the optical pickup device can be reduced, and the occurrence of various types of aberration due to the attaching error of a coupling lens can be prevented.

More preferably, a magnification m satisfies a formula $-0.148 \leq m \leq -0.117$.

Preferably, information is reproduced and/or recorded for a third optical information recording medium having a protect substrate thickness t3 (t3>t2) by using a light beam having a third wavelength λ3 (λ3>λ2) emitted from a third light source.

BRIEF DESCRIPTION OF THE DRAWINGS

The present invention will become more fully understood from the detailed description given hereinbelow and the accompanying drawing which are given by way of illustration only, and thus are not intended as a definition of the limits of the present invention, and wherein;

FIG. 4 is a graph showing diffraction efficiencies;

PREFERRED EMBODIMENTS OF THE INVENTION

First Embodiment

Hereinafter, an objective optical element and an optical pickup device according to the first embodiment of the present invention will be explained with reference to the drawings.

Figure 1:
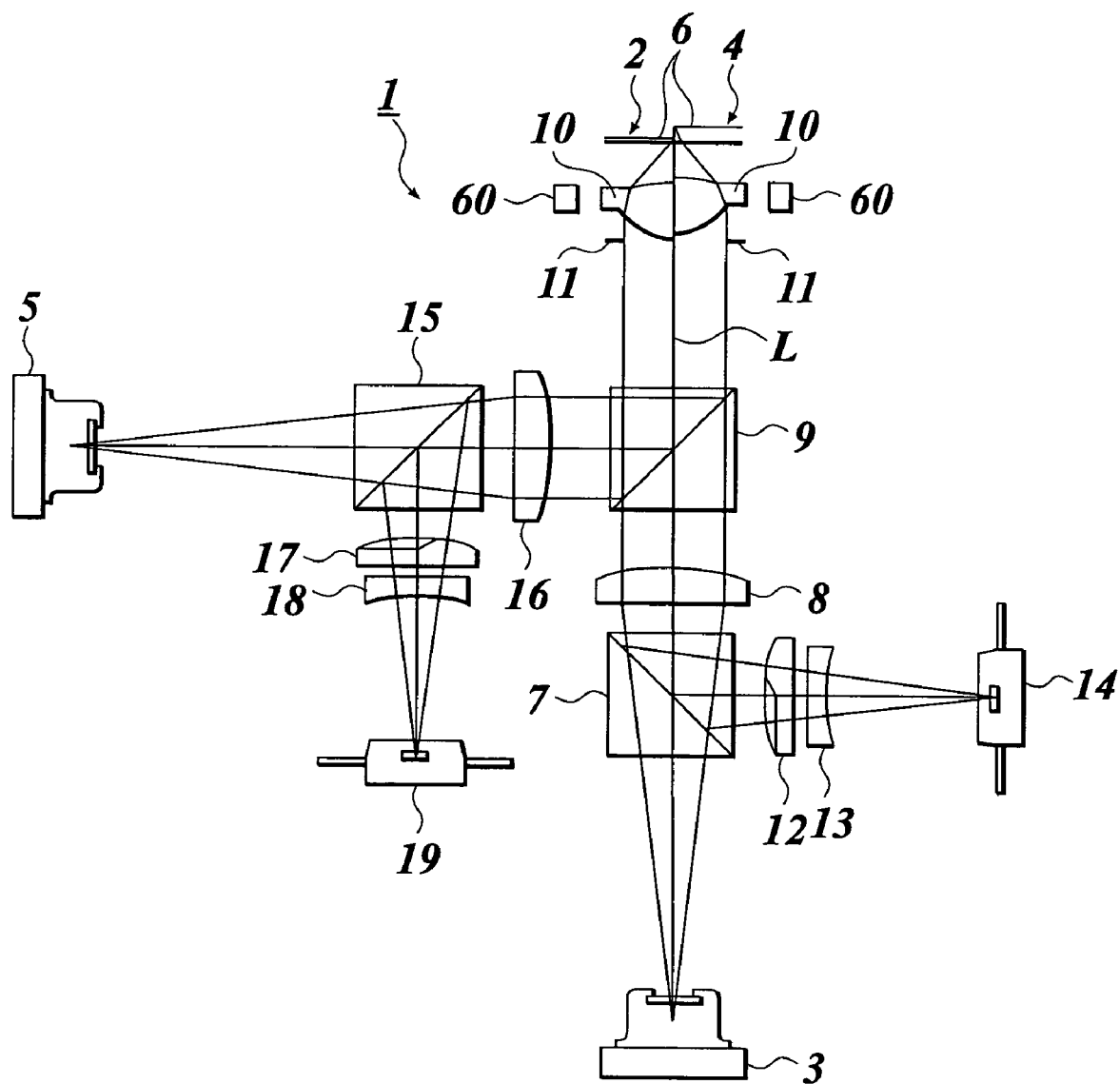
FIG. 1 is a schematic view of an optical pickup device and an optical element according to a first embodiment of the present invention.

As shown in FIG. 1, in an optical pickup device 1, a light beam of a wavelength λ1 (=405 nm) is emitted from a first semiconductor laser 3 to a first optical information recording medium 2 (high density DVD in this embodiment) denoting an optical information recording medium, and a light beam of a wavelength λ2 (=655 nm) is emitted from a second semiconductor laser 5 to a second optical information recording medium 4 (DVD in this embodiment). Thereby, information is recorded or reproduced in/from an information recording plane 6 of the first optical information recording medium 2 or the second optical information recording medium 4.

Thereafter, when information is recorded or reproduced in/from the high density DVD 2, the light beam having the wavelength λ1 emitted from the first semiconductor laser 3 passes through a beam splitter 7 and is transmitted through a collimator 8 to form a parallel light beam. Thereafter, the light beam passes through a beam splitter 9 and a stop 11 and is converged by an objective lens 10 on the information recording plane 6 through a protect substrate of the high density DVD 2.

The function of the objective lens 10 for the light beam having the wavelength λ1 will be described later.

Thereafter, the light beam is modulated and reflected in/on an information pit of the information recording plane 6 and again passes through the objective lens 10 the stop 11, the beam splitter 9 and the collimator 8 to form a converged light beam. Thereafter, the light beam is reflected in the beam splitter 7, and astigmatism is given to the light beam in a cylindrical lens 12. Thereafter, the light beam is incident on a photo detector 4 through a concave lens 13, and a read-out signal of information recorded in the high density DVD 2 is obtained from a signal output from the photo detector 4.

When information is recorded or reproduced in/from the DVD 4, the light beam having the wavelength λ2 emitted from the second semiconductor laser 5 passes through a beam splitter 15 and is transmitted through a collimator 16 to form a parallel light beam. Thereafter, the light beam passes through the beam splitter 9 and the stop 11 and is converged by the objective lens 10 on the information recording plane 6 through a protect substrate of the DVD 4.

The function of the objective lens 10 for the light beam having the wavelength λ2 will be described later.

Thereafter, the light beam is modulated and reflected in/on an information pit of the information recording plane 6 and again passes through the objective lens 10 and the stop 11. Thereafter, the light beam is reflected in the beam splitter 9 and passes through the collimator 16 to form a converged light beam. Thereafter, the light beam is reflected in the beam splitter 15, and astigmatism is given to the light beam in a cylindrical lens 17. Thereafter, the light beam is incident on a photo detector 19 through a concave lens 18, and a read-out signal of information recorded in the DVD 4 is obtained from a signal output from the photo detector 19.

Further, a change in amount of light due to a change of a spot shape and a positional change on each of the photo detector 14 and 19 are detected, and the focusing detection and the tracking detection are performed. Thereafter, according to this detection result, a two-dimensional actuator 160 moves the objective lens 10 so as to converge the light beam emitted from the first semiconductor laser 3 or the second semiconductor laser 5 on a prescribed track of the information recording plane 6 of the high density DVD 2 or the DVD 4.

Figure 2:
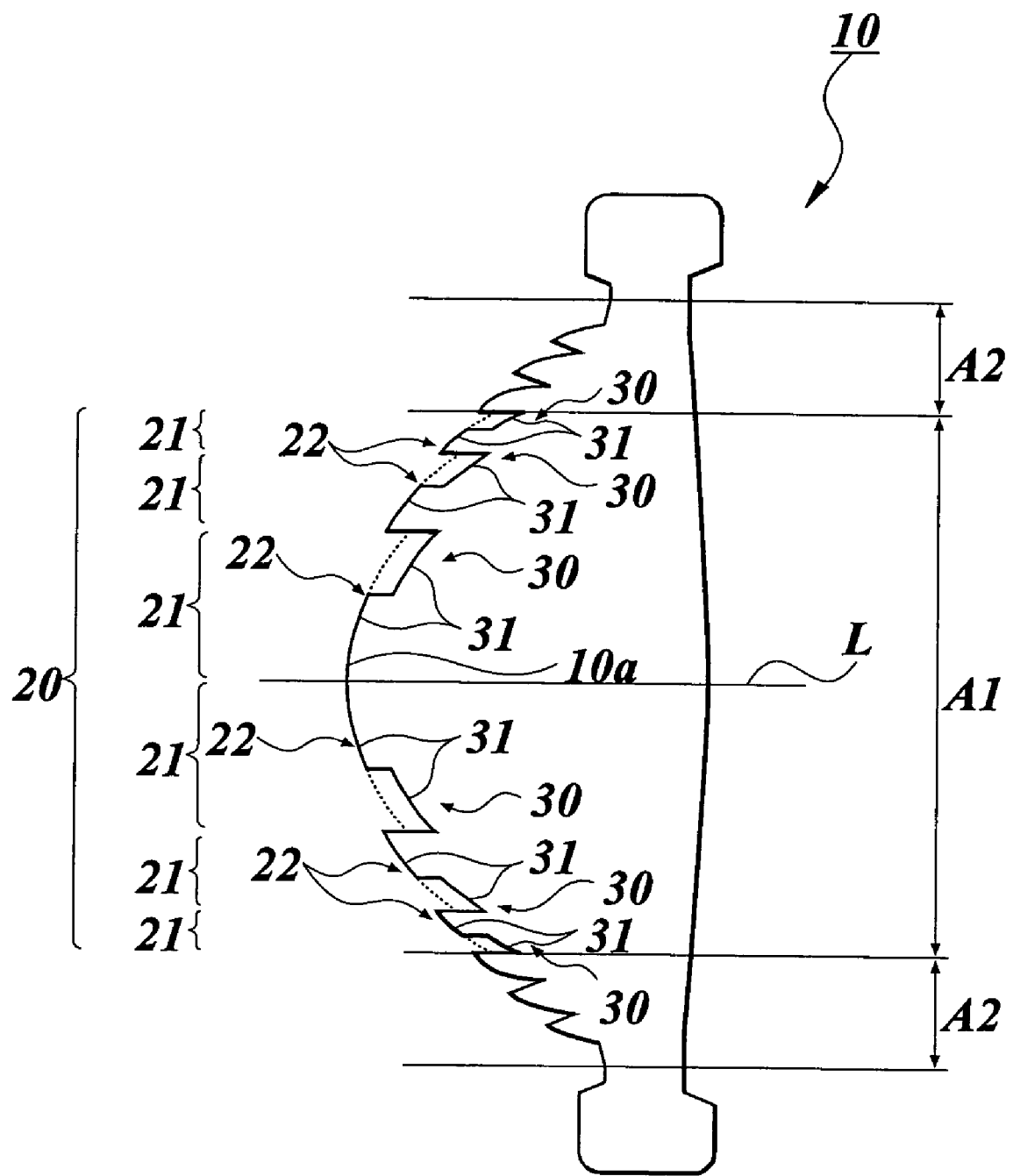
FIG. 2 is a side view showing the configuration of an objective lens.

As shown in FIG. 2, the objective lens 10 representing an objective optical element is made of a single lens having two aspherical surfaces and composes an optical system of the optical pickup device 1. A diffractive structure 20 having an optical path difference giving structure 30 are arranged on the side of an optical surface 10a of the objective lens 10 facing toward the light source.

In detail, the objective lens 10 comprises the diffractive structure 20 which has a plurality of blade-shaped diffracting ring-shaped zones 21 respectively arranged around an optical axis L. The optical surface of each diffracting ring-shaped zone 21 is formed to arrange a structure 22 having a diffracting function in the diffractive structure 20, and the structures 22 of the diffracting ring-shaped zones 21 are formed in a serrate shape. The objective lens 10 also comprises the optical path difference giving structure 30 placed on the side of the optical surfaces of the diffracting ring-shaped zones 21 and gives a prescribed optical path difference for a light beam passing through each structure 22 having a diffracting function. The surface of the optical path difference giving structure 30 forms a stepwise discontinuous surface composed of a plurality of divided surfaces 31.

In this embodiment, each diffracting ring-shaped zone 21 has two divided surfaces 31.

Figure 3A:
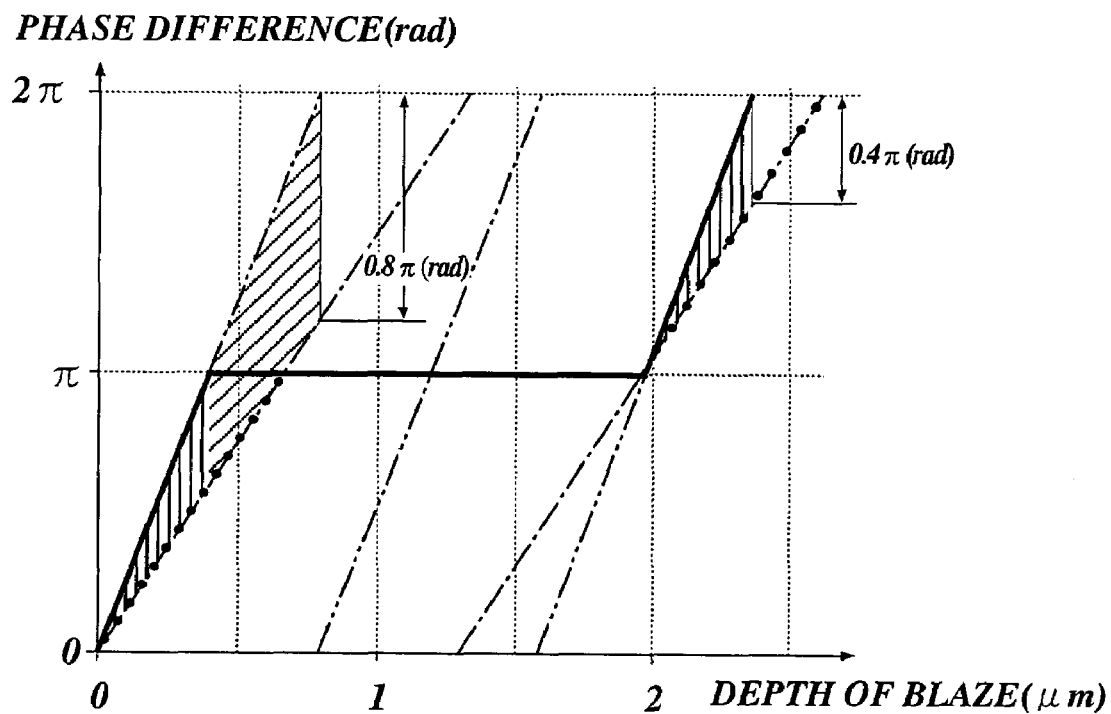
FIG. 3A is a graph showing a change in phase difference between the light beams having wavelengths λ1 and λ2.
Figure 3B:
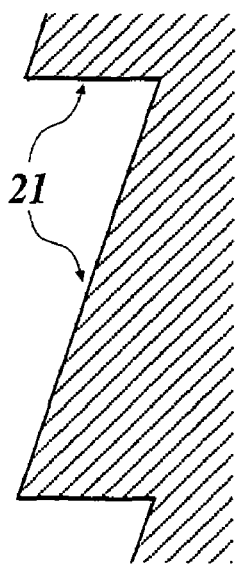
FIG. 3B is an enlarged view of an objective lens having no optical path difference giving structure.
Figure 3C:
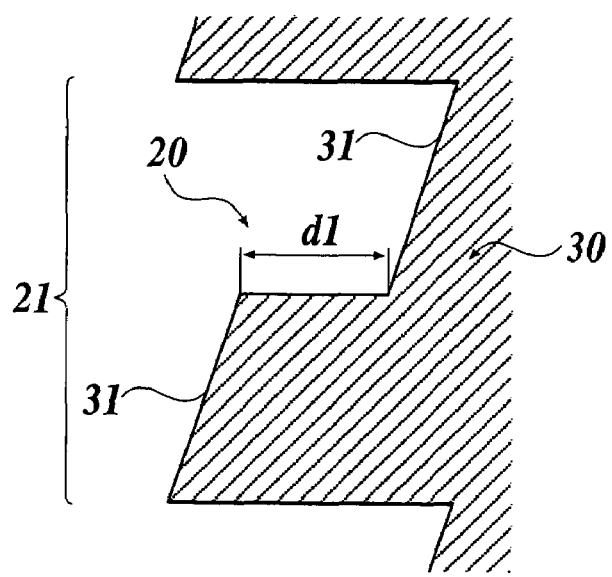
FIG. 3C is an enlarged view of an objective lens having an optical path difference giving structure.

FIG. 3A is a graph showing a change in phase difference with respect to a blaze depth when each of a parallel light beam having the wavelength λ1 and a parallel light beam having the wavelength λ2 passes through each of diffraction gratings of FIGS. 3B and 3C set to a refractive index n1=1.525 for the wavelength λ1 and a refractive index n2=1.507 for the wavelength λ2 from the left of the paper of the drawing.

In FIG. 3A, two-dots-dash-lines indicate the phase difference for the 1st order diffracted light of the light beam having the wavelength λ1 passing through the diffraction grating of the well-known diffractive structure of FIG. 3B, and dot-dash-lines indicate the phase difference for the 1st order diffracted light of the light beam having the wavelength λ2 passing through the diffraction grating of the well-known diffractive structure of FIG. 3B.

Further, in FIG. 3A, a solid line indicates the phase difference for the 1st order diffracted light of the light beam having the wavelength λ1 passing through the diffracting ring-shaped zone 21 shown in FIG. 3C, and a dotted line indicates the phase difference for the 1st order diffracted light of the light beam having the wavelength λ2 passing through the diffracting ring-shaped zone 21 shown in FIG. 3C.

As shown in FIG. 3C, the depth d1 of each divided surface 31 is set to produce the optical path difference equal to twice of the wavelength λ1. Therefore, the optical path difference equal to twice of the wavelength λ1 is generated between the light beam having the wavelength λ1 passing through one divided surface 31 and the light beam having the wavelength λ1 passing through the adjacent divided surface 31, and no shift of the wave front occurs in the light beam.

As described above, the optical element of this embodiment has a function for giving a change in phase for at least one of the light beams of the wavelength λ1 and the wavelength λ2 passing through the optical element (the objective lens 10) by arranging the optical path difference giving structure 30 having the divided surfaces 31 set to a prescribed depth on an optical functional surface of the optical element. Further, when the surface shape of the divided surface 31 is determined by that of each diffracting ring-shaped zone 21 formed by dividing the structure 22 having the diffracting function at intervals corresponding to a plurality of divided surfaces 31 and moving the divided ones in the direction of the optical axis L, the optical element of this embodiment has a function for outputting a type of diffracted light of one of the light beams of the wavelength λ1 and the wavelength λ2 in a condition that the diffracted light has a maximum diffraction efficiency.

For example, when the light beam having the wavelength λ1 (405 nm) is incident on the optical element, the shape of the divided surfaces 31 shown in FIG. 3C is the same as or similar to a shape which is obtained by dividing the surface shape of the diffracting ring-shaped zone 21 shown in FIG. 3B at intervals corresponding to the divided surfaces 31 and moving the divided ones in the direction of the optical axis L so as to give the optical path difference equal to twice of the wavelength to the light beam having the wavelength λ1.

Therefore, each optical path difference giving structure 30 gives the optical path difference equal to twice of the wavelength to the light beam having the wavelength λ1.

Accordingly, as shown in FIG. 3A, in case of the light beam having the wavelength λ1, the phase difference distribution (solid line) obtained by giving the optical path difference equal to twice of the wavelength by using the optical path difference giving structure 30 is approximately coincident with the phase difference distribution (two-dots-dash-line) obtained by giving no optical path difference. In other words, in the structure, a change in phase hardly occurs in the 1st order diffracted light of the light beam having the wavelength λ1.

In contrast, when the light beam having the wavelength λ2 is incident on the optical element, the optical path difference equal to a maximum of around 0.6 time of the wavelength is generated in the light beam having the wavelength λ2 with respect to the light beam having the wavelength λ1 by the well-known diffractive structure.

Further, the optical path difference equal to a maximum of around 1.2 times of wavelength (0.6×2) is generated by the optical path difference giving structure 30. Therefore, in total, the optical path difference equal to 1.8 times of the wavelength is generated for the light beam having the wavelength λ2.

Here, when the optical element has only the diffractive structure without the optical path difference giving structure 30, a phase difference between the light beam having the wavelength λ1 and the light beam having the wavelength λ2 is 0.4 time (1.0−0.6) of the wavelength at a maximum, that is, around 0.8π radians shown by an arrow of FIG. 3A.

In contrast, because the optical element has the optical path difference giving structure 30 in this embodiment, a phase difference between the light beam having the wavelength λ1 and the light beam having the wavelength λ2 is around 0.2 time (2.0−1.8) of the wavelength at a maximum, that is, around 0.4π radians shown by an arrow of FIG. 3A. Therefore, as compared with the diffractive structure without the optical path difference giving structure 30, the phase difference is lowered.

As described above, in the optical element 10 of this embodiment of the present invention, a prescribed order of the diffracted light of the light beam having the wavelength λ1 has a maximum diffraction efficiency due to the diffracting function of the optical surface of the diffractive structure 20, and diffracted light of a prescribed order in the light beam having the wavelength λ2 has a maximum diffraction efficiency due to the diffracting function of the optical surface of the diffractive structure 20 the optical path difference giving structure 30 substantially gives no change in phase to the diffracted light of the light beam having the wavelength λ1, and gives a change in phase to the diffracted light of the light beam having the wavelength λ2. Therefore, an absolute value of the phase difference between the diffracted light of the light beam having the wavelength λ1 and the diffracted light of the light beam having the wavelength λ2 is lowered.

Here, the absolute value of the phase difference is desired to be set to a value lower than 0.6π radians.

FIG. 4 shows a calculating result of diffraction efficiencies of various types of diffracted light ranging from −2nd order to +2nd order when the wavelength of light emitted from the light source is changed in a range from 350 nm to 800 nm.

As realized in FIG. 4, not only the diffraction frequency of the −1st order diffracted light is approximately 100% at around 400 nm in wavelength, but also the diffraction frequency of the −1st order diffracted light can be heightened to around 85% at around 650 nm in wavelength. Therefore, a sufficient amount of light can be obtained.

In this embodiment, as described above, the depth (the length in the direction of the optical axis) d1 of each divided surface 31 is set to a length corresponding to the optical path difference equal to an integral multiple of the wavelength λ2, the shape of each divided surface 31 is set to be the same as or similar to a shape which is obtained by dividing each of the diffracting ring-shaped zones formed in the serrate shape shown in FIG. 3B at intervals corresponding to the divided surfaces 31 and moving the divided zones in the direction of the optical axis L. However, the depth d1 and the shape of each divided surface 31 can be appropriately modified according to the wavelengths of the light beams to be used or the like.

FIRST EXAMPLE

Next, a first example of the optical pickup device 1 and the optical element 10 will be described.

In this example, as shown in FIG. 2, the diffractive structure 20 and the optical path difference giving structure 30 are provided in a region A1 (hereinafter, named "central region A1") which is placed on one optical surface (on the light source side) of the objective lens denoting an optical element which is a single lens having both-sided aspherical surfaces and is away from the optical axis by a prescribed height (1.2 mm or less in this example).

Further, general diffracting ring-shaped zones formed in a serrate shape are formed in a region A2 (hereinafter, named "peripheral region A2") which is arranged on the optical surface except the central region A1.

In each diffracting ring-shaped zone 21, the farther the divided surface 31 is away from the optical axis L, the deeper the divided surface 31 is fallen in the inside of the objective lens 10.

Further, the structure 22 having the diffracting function is set so as to set the diffraction efficiency of the 1st order diffracted light having the wavelength λ1 to approximately 100%, and the optical path difference giving structure 30 is set so as to give the optical path difference equal to an integral multiple of the wavelength λ1 to the light beam having the wavelength λ1.

Lens data of the objective lens 10 is shown in Table 1 and Table 2.

TABLE 1

First example
f1 = 2.33 mm, f2 = 2.35 mm
NA1 = 0.65, NA2 = 0.51

| i-th surface | Ri | di (660 nm) | ni (660 nm) | di (785 nm) | ni (785 nm) |
|---|---|---|---|---|---|
| 0 | ∞ | | | | |
| 1 | ∞ | 0.0 | 1.0 | 0.0 | 1.0 |
| 2 | 1.42364 | 1.29000 | 1.5290 | 1.29000 | 1.5254 |
| 2' | 1.52108 | 0.00527 | 1.5290 | 0.00527 | 1.5254 |
| 3 | −6.30217 | 1.62791 | 1.0 | 1.26273 | 1.0 |
| 4 | ∞ | 0.6 | 1.2189 | 1.2 | 0.8492 |
| 5 | ∞ | | | | |

Here, di denotes the displacement from the i-th surface to the (i+1)-th surface, and d2' denotes the displacement from the second surface to the 2'nd surface.

As shown in Table 1, in the objective lens 10 of this example, in case of the first wavelength λ1=660 nm of the light emitted from the first light source, the focal length f=2.33 nm and the image side numerical aperture NA=0.65 are set. In case of the second wavelength λ2=785 nm of the light emitted from the second light source, the focal length f=2.35 nm and the image side numerical aperture NA=0.51 are set.

The second surface in Table 1 denotes the optical surface 10a of the objective lens 10 on the light source side in the central region A1 less than the height h of 1.20 mm from the optical axis L. The 2'nd surface in Table 1 denotes the optical surface 10a of the objective lens 10 on the light source side in the peripheral region A2 equal to or more than the height h of 1.20 mm from the optical axis L. The third surface in Table 1 denotes the optical surface 10b of the objective lens 10 on the side of the optical information recording medium 2 or 4. The fourth surface denotes the surface of the protect substrate of the optical information recording medium 2 or 4. The fifth surface denotes the information record plane 6 of the optical information recording medium 2 or 4. Further, Ri denotes a curvature radius, di denotes the displacement in the direction of the optical axis from the i-th surface to the (i+1)-th surface, and ni denotes a refractive index of each surface.

The second, 2'nd and third surfaces of the objective lens 10 are defined in a mathematical formula, which is obtained by substituting coefficients shown in Tables 1 and 2 into a following aspherical shape formula (1), and are respectively formed in an aspherical shape in axially symmetric with respect to the optical axis L.

(Aspherical Shape Formula)

$$X(h) = \frac{(h^2/R)}{1+\sqrt{1-(1+\kappa)(h/R)^2}} + \sum_{i=0}^{9} A_{2i} h^{2i} \tag{1}$$

Here, X(h) denotes an axis in the direction of the optical axis L (the propagating direction of light is positive), κ denotes a conic constant, and $A_{2i}$ denotes coefficients of the aspherical surfaces.

TABLE 2

Aspherical surface data

Second surface (0 ≦ h < 1.2 mm)
Coefficients of aspherical surface

κ = −2.7006 × 10⁰
A4 = +9.0072 × 10⁻²
A6 = −3.4130 × 10⁻²
A8 = +1.7301 × 10⁻²
A10 = −9.0048 × 10⁻³
A12 = +3.5278 × 10⁻³
A14 = −6.1020 × 10⁻⁴

Coefficients of optical path difference function
(reference wavelength: 690 nm)

B4 = −4.9138 × 10⁻³
B6 = −9.5829 × 10⁻⁴
B8 = −2.1917 × 10⁻⁴
B10 = +7.3376 × 10⁻⁵

2'nd surface (1.22 mm ≦ h)
Coefficients of aspherical surface

κ = −3.2519 × 10⁻⁰
A4 = +1.0460 × 10⁻¹
A6 = −2.1964 × 10⁻²
A8 = +1.9963 × 10⁻³
A10 = −2.6530 × 10⁻³
A12 = +2.5293 × 10⁻³
A14 = −5.4124 × 10⁻⁴

Coefficients of optical path difference function
(reference wavelength: 660 nm)

B2 = −5.1790 × 10⁻³
B4 = −2.2260 × 10⁻³
B6 = +2.2434 × 10⁻³
B8 = +2.5054 × 10⁻³
B10 = +6.3807 × 10⁻⁴

Third surface
Coefficients of aspherical surface

κ = −9.0480 × 10⁺¹
A4 = +4.8522 × 10⁻³
A6 = −7.4420 × 10⁻³
A8 = +1.0411 × 10⁻²
A10 = −4.5226 × 10⁻³
A12 = +4.0160 × 10⁻⁴
A14 = +5.4670 × 10⁻⁵

Further, the pitch of the diffracting ring-shaped zones 21 is determined in a mathematical formula, and is obtained by substituting coefficients shown in Table 2 into a following optical path difference function (2).

(Optical Path Difference Function)

$$\phi(h) = \sum_{i=0}^{5} B_{2i} h^{2i} \tag{2}$$

Here, $B_{2i}$ is coefficients of the optical path difference function.

Further, an optical path difference of the light beam having the wavelength λ1 or λ2 at an arbitrary height h from the optical axis L is expressed in a following optical path difference expression formula (3).

(Optical Path Difference Expression Formula)

$$\phi'(h) = N \times \text{MOD}\{\phi(h)/\lambda\} - p \times \text{INT}[M \times \text{MOD}\{\phi(h)/\lambda\}] \times \frac{\lambda_i}{\lambda} \times \frac{n-1}{n_i-1} \quad (3)$$

h: height from optical axis
$A_{2i}$: aspherical coefficients
$B_{2i}$: coefficients of optical path difference function
MOD: decimal fraction of a numeral
INT: integer of a numeral
$\lambda$: reference wavelength (wavelength at which diffraction efficiency is theoretically 100%)
n: refractive index at reference wavelength
$\lambda i$: reference wavelength of optical path difference giving structure (wavelength at which no change in phase occurs in optical path difference giving structure)
$n_i$: refractive index at $\lambda i$
p: optical path difference ($\lambda$) per step of optical path difference giving structure for wavelength $\lambda i$
N: diffraction order
M: number of divided surfaces in one diffracting ring-shaped zone (number of steps)
Further, values of $\lambda i$, p, N and M are shown in Table 3

TABLE 3

Values of $\lambda i$, p, N and M in examples

|  | First Example | Second Example | Third Example | Fourth Example |
|---|---|---|---|---|
| $\lambda i$ | 655 nm | 405 nm | 405 nm | 380 nm |
| p | −5 | −2 | −2 | −2 |
| N | 1 | 1 | 1 | 1 |
| M | 2 | 2 | 2 | 2 |

In the first example, the diffraction efficiency of each diffracting ring-shaped zone 21 is approximately 100% for the 1st order diffracted light having the wavelength $\lambda 1$ and is around 95% for the 1st order diffracted light having the wavelength $\lambda 2$. These diffraction efficiencies are higher by around 5% than those in the well-known diffractive structure.

SECOND EXAMPLE

Next, a second example of the optical pickup device 1 and the objective optical element 10 described in this embodiment will be explained.

In this example, in the same manner as in the first example, as shown in FIG. 2, the diffractive structure 20 and the optical path difference giving structure 30 are provided in a central region A1 which is placed on one optical surface 10a (on the light source side) of the objective lens 10 denoting an optical element of a single lens having both-sided aspherical surfaces and is away from the optical axis by a distance of 1.34 mm or less.

Further, general diffracting ring-shaped zones formed in the serrate shape are formed on the peripheral region A2.

In each diffracting ring-shaped zone 21, the farther the divided surface 31 is away from the optical axis L, the deeper the divided surface 31 is fallen in the inside of the objective lens 10.

Further, the structure 22 having the diffracting function is set so as to set the diffraction efficiency of the 1st order diffracted light having the wavelength $\lambda 1$ to approximately 100%, and the optical path difference giving structure 30 is set so as to give the optical path difference equal to an integral multiple of the wavelength $\lambda 1$ to the light beam having the wavelength $\lambda 1$.

Lens data of the objective lens 10 is shown in Table 4 and Table 5.

TABLE 4

Second example
f1 = 2.00 mm, f2 = 2.06 mm
NA1 = 0.85, NA2 = 0.65

| i-th surface | Ri | di (405 nm) | ni (405 nm) | di (655 nm) | ni (655 nm) |
|---|---|---|---|---|---|
| 0 |  | ∞ |  | ∞ |  |
| 1 | ∞ | 0.0 | 1.0 | 0.0 | 1.0 |
| 2 | 1.25531 | 2.22000 | 1.52491 | 2.22000 | 1.50673 |
| 2' | 1.37269 | 0.00942 | 1.52491 | 0.00942 | 1.50673 |
| 3 | −2.50906 | 0.72085 | 1.0 | 0.45468 | 1.0 |
| 4 | ∞ | 0.1 | 1.61949 | 0.6 | 1.57752 |
| 5 | ∞ |  |  |  |  |

Here, di denotes the displacement from the i-th surface to the (i+1)-th surface, and d2' denotes the displacement from the second surface to the 2'nd surface.

TABLE 5

Aspherical surface data

Second surface ($0 \leq h < 1.34$ mm)
Coefficients of aspherical surface $\kappa = -6.4184 \times 10^{-1}$
$A4 = +6.0111 \times 10^{-3}$
$A6 = +1.3824 \times 10^{-3}$
$A8 = -1.5922 \times 10^{-3}$
$A10 = +8.2924 \times 10^{-4}$
$A12 = +5.5186 \times 10^{-4}$
$A14 = -9.7245 \times 10^{-4}$
$A16 = +5.2133 \times 10^{-4}$
$A18 = -1.1435 \times 10^{-4}$
$A20 = +7.3173 \times 10^{-6}$ Coefficients of optical path difference function
(reference wavelength: 405 nm)

$B4 = -2.5646 \times 10^{-3}$
$B6 = -9.6475 \times 10^{-5}$
$B8 = -3.3058 \times 10^{-4}$
$B10 = +1.9775 \times 10^{-5}$ 2'nd surface (1.34 mm $\leq$ h)
Coefficients of aspherical surface $\kappa = -5.6733 \times 10^{-1}$
$A4 = +1.9664 \times 10^{-2}$
$A6 = -5.0827 \times 10^{-4}$
$A8 = +2.2416 \times 10^{-3}$
$A10 = +1.8200 \times 10^{-4}$
$A12 = -3.6697 \times 10^{-4}$
$A14 = +8.4577 \times 10^{-5}$
$A16 = -1.8143 \times 10^{-5}$
$A18 = +2.3679 \times 10^{-5}$
$A20 = -5.9259 \times 10^{-6}$ Coefficients of optical path difference function
(reference wavelength: 405 nm)

$B2 = -1.0231 \times 10^{-2}$
$B4 = +1.3102 \times 10^{-3}$
$B6 = -5.7778 \times 10^{-4}$
$B8 = +9.3656 \times 10^{-4}$
$B10 = -2.4332 \times 10^{-4}$ TABLE 5-continued Aspherical surface data Third surface
Coefficients of aspherical surface $\kappa = -4.9112 \times 10^{+1}$
$A4 = +4.1345 \times 10^{-2}$
$A6 = -7.3373 \times 10^{-3}$
$A8 = -6.4839 \times 10^{-3}$
$A10 = +3.0509 \times 10^{-3}$
$A12 = -7.7472 \times 10^{-5}$
$A14 = -1.8723 \times 10^{-4}$
$A16 = +2.9365 \times 10^{-5}$ As shown in Table 4, in the objective lens 10 of this example, in case of the first wavelength λ1=405 nm of the light emitted from the first light source, the focal length f=2.00 nm and the image side numerical aperture NA=0.85 are set. In case of the second wavelength λ2=655 nm of the light emitted from the second light source, the focal length f=2.06 nm and the image side numerical aperture NA=0.65 are set.

The second, 2'nd and third surfaces of the objective lens 10 are defined in a mathematical formula, are obtained by substituting coefficients shown in Tables 4 and 5 into the aspherical shape formula (1), and are respectively formed in an aspherical shape in axially symmetric with respect to the optical axis L.

Further, the pitch of the diffracting ring-shaped zones 21 is determined in a mathematical formula, and is obtained by substituting coefficients shown in Table 5 into the optical path difference function (2).

Further, an optical path difference of the light beam having the wavelength λ1 or λ2 at an arbitrary height h from the optical axis L is expressed in a mathematical formula, and is obtained by substituting coefficients shown in Table 3 into the optical path difference expression formula (3).

In the second example, the diffraction efficiency of each diffracting ring-shaped zone 21 is approximately 100% for the 1st order diffracted light having the wavelength λ1 and is around 85% for the 1st order diffracted light having the wavelength λ2. These diffraction efficiencies are higher by around 30% than those in the well-known diffractive structure.

THIRD EXAMPLE

Next, a third example of the optical pickup device 1 and the objective optical element 10 described in this embodiment will be explained.

Figure 5:
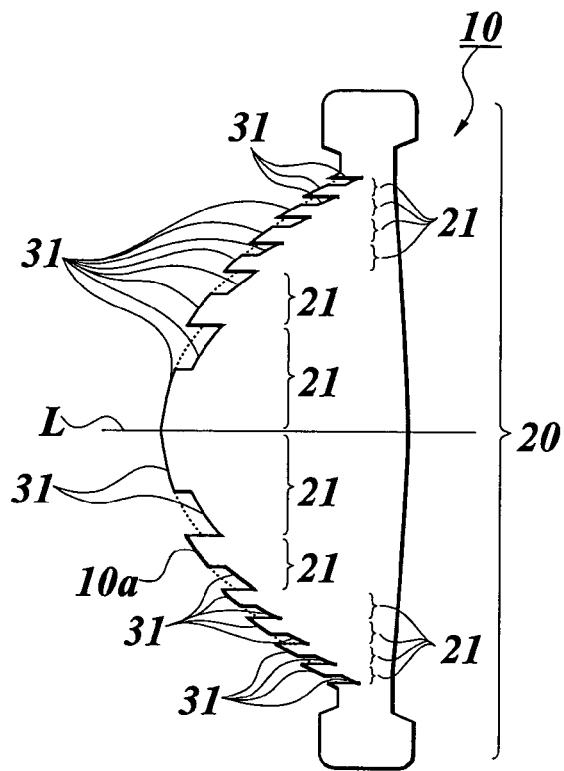
FIG. 5 is a side view showing the configuration of an objective lens.

In this example, as shown in FIG. 5, the diffractive structure 20 and the optical path difference giving structure 30 are provided on one whole optical surface 10a (on the light source side) of the objective lens 10 denoting an optical element of a single lens having both-sided aspherical surfaces.

In each diffracting ring-shaped zone 21, the farther the divided surface 31 is away from the optical axis L, the deeper the divided surface 31 is fallen in the inside of the objective lens 10.

Further, the structure 22 having the diffracting function is set so as to set the diffraction efficiency of the 1st order diffracted light having the wavelength λ1 to approximately 100%, and the optical path difference giving structure 30 is set so as to give the optical path difference equal to an integral multiple of the wavelength λ1 to the light beam having the wavelength λ1.

Lens data of the objective lens 10 is shown in Table 6 Table 7.

TABLE 6

Third example
f1 = 2.40 mm, f2 = 2.38 mm
NA1 = 0.65, NA2 = 0.65

| i-th surface | Ri | di (405 nm) | ni (405 nm) | di (655 nm) | ni (655 nm) |
|---|---|---|---|---|---|
| 0 |  | ∞ |  | ∞ |  |
| 1 | ∞ | 0.0 | 1.0 | 0.0 | 1.0 |
| 2 | 1.55720 | 1.60000 | 1.52491 | 1.60000 | 1.50673 |
| 3 | −6.67199 | 1.10173 | 1.0 | 1.10173 | 1.0 |
| 4 | ∞ | 0.6 | 1.61949 | 0.6 | 1.57752 |
| 5 | ∞ |  |  |  |  |

Here, di denotes the displacement from the i-th surface to (i+1)-th surface.

TABLE 7

Aspherical surface data

Second surface
Coefficients of aspherical surface $\kappa = -7.3475 \times 10^{-1}$
$A4 = +6.5748 \times 10^{-3}$
$A6 = +9.2164 \times 10^{-4}$
$A8 = +1.1841 \times 10^{-3}$
$A10 = -5.8766 \times 10^{-4}$
$A12 = +1.7873 \times 10^{-4}$
$A14 = +8.6359 \times 10^{-6}$
$A16 = -9.0485 \times 10^{-6}$
$A18 = -5.5710 \times 10^{-6}$ Coefficients of optical path difference function
(reference wavelength: 405 nm)

$B2 = -1.5660 \times 10^{-2}$
$B4 = -1.3080 \times 10^{-3}$
$B6 = +1.2828 \times 10^{-4}$
$B8 = -6.6741 \times 10^{-5}$
$B10 = -6.4951 \times 10^{-6}$ Third surface
Coefficients of aspherical surface $\kappa = -5.0959 \times 10^{+1}$
$A4 = +4.7700 \times 10^{-3}$
$A6 = +8.5987 \times 10^{-3}$
$A8 = -3.5378 \times 10^{-3}$
$A10 = -1.4722 \times 10^{-3}$
$A12 = +1.5928 \times 10^{-4}$
$A14 = +2.3576 \times 10^{-4}$
$A16 = -4.5296 \times 10^{-5}$ As shown in Table 6, in the objective lens 10 of this example, in case of the first wavelength λ1=405 nm of light emitted from the first light source, the focal length f=2.38 nm and the image side numerical aperture NA=0.65 are set. In case of the second wavelength λ2=655 nm of light emitted from the first light source, the focal length f=2.40 nm and the image side numerical aperture NA=0.65 are set.

The second and third surfaces of the objective lens 10 are defined in a mathematical formula, are obtained by substituting coefficients shown in Tables 6 and 7 into the aspherical shape formula (1), and are respectively formed in an aspherical shape in axially symmetric with respect to the optical axis L.

Further, the pitch of the diffracting ring-shaped zones 21 is determined in a mathematical formula, and is obtained by substituting coefficients shown in Table 7 into the optical path difference function (2).

Moreover, an optical path difference of the light beam having the wavelength λ1 or λ2 at an arbitrary height h from the optical axis L is expressed in a mathematical formula, and is obtained by substituting coefficients shown in Table 3 into the optical path difference expression formula (3).

In the third example, the diffraction efficiency of each diffracting ring-shaped zone 21 is approximately 100% for the 1st order diffracted light having the wavelength λ1 and is around 85% for the 1st order diffracted light having the wavelength λ2. These diffraction efficiencies are higher by around 30% than those in the well-known diffractive structure.

FOURTH EXAMPLE

Next, a fourth example of the optical pickup device 1 and the objective optical element 10 described in this embodiment will be explained.

In this example, in the same manner as in the third example, as shown in FIG. 5, the diffractive structure 20 and the optical path difference giving structure 30 are provided on one whole optical surface 10a (on the light source side) of the objective lens 10 denoting an optical element of a single lens having both-sided aspherical surfaces.

In each diffracting ring-shaped zone 21, the farther the divided surface 31 is away from the optical axis L, the deeper the divided surface 31 is fallen in the inside of the objective lens 10.

Further, the structure 22 having the diffracting function is set so as to set the diffraction efficiency of the 1st order diffracted light having the wavelength λ1 to around 80%, and the optical path difference giving structure 30 is set so as to give an optical path difference not equal to an integral multiple of the wavelength λ1 or λ2 to the light beam having the wavelength λ1 or the light beam having the wavelength λ2.

Lens data of the objective lens 10 is shown in Table 8 Table 9.

TABLE 8

Fourth example
f1 = 2.40 mm, f2 = 2.38 mm
NA1 = 0.65, NA2 = 0.65

| i-th surface | Ri | di (405 nm) | ni (405 nm) | di (655 nm) | ni (655 nm) |
|---|---|---|---|---|---|
| 0 |  | ∞ |  | ∞ |  |
| 1 | ∞ | 0.0 | 1.0 | 0.0 | 1.0 |
| 2 | 1.55720 | 1.60000 | 1.52491 | 1.60000 | 1.50673 |
| 3 | −6.67199 | 1.10173 | 1.0 | 1.10173 | 1.0 |
| 4 | ∞ | 0.6 | 1.61949 | 0.6 | 1.57752 |
| 5 | ∞ |  |  |  |  |

Here, di denotes the displacement from the i-th surface to (i+1)-th surface.

TABLE 9

Aspherical surface data

Second surface
Coefficients of aspherical surface $\kappa = -7.3475 \times 10^{-1}$
$A4 = +6.5748 \times 10^{-3}$
$A6 = +9.2164 \times 10^{-4}$
$A8 = +1.1841 \times 10^{-3}$
$A10 = -5.8766 \times 10^{-4}$
$A12 = +1.7873 \times 10^{-4}$
$A14 = +8.6359 \times 10^{-6}$ TABLE 9-continued Aspherical surface data $A16 = -9.0485 \times 10^{-6}$
$A18 = -5.5710 \times 10^{-6}$
Coefficients of optical path difference function
(reference wavelength: 500 nm)

$B2 = -1.9333 \times 10^{-2}$
$B4 = -1.6148 \times 10^{-3}$
$B6 = +1.5837 \times 10^{-4}$
$B8 = -8.2396 \times 10^{-5}$
$B10 = -8.0186 \times 10^{-6}$
Third surface
Coefficients of aspherical surface $\kappa = -5.0959 \times 10^{+1}$
$A4 = +4.7700 \times 10^{-3}$
$A6 = +8.5987 \times 10^{-3}$
$A8 = -3.5378 \times 10^{-3}$
$A10 = -1.4722 \times 10^{-3}$
$A12 = +1.5928 \times 10^{-4}$
$A14 = +2.3576 \times 10^{-4}$
$A16 = -4.5296 \times 10^{-5}$ As shown in Table 8, in the objective lens 10 of this example, in case of the first wavelength λ1=405 nm of light emitted from the first light source, the focal length f=2.38 nm and the image side numerical aperture NA=0.65 are set. In case of the second wavelength λ2=655 nm of light emitted from the first light source, the focal length f=2.40 nm and the image side numerical aperture NA=0.65 are set.

The second and third surfaces of the objective lens 10 are defined in a mathematical formula, are obtained by substituting coefficients shown in Tables 8 and 9 into the aspherical shape formula (1), and are respectively formed in an aspherical shape in axially symmetric with respect to the optical axis L.

Further, the pitch of the diffracting ring-shaped zones 21 is determined in a mathematical formula, and is obtained by substituting coefficients shown in Table 9 into the optical path difference function (2).

Moreover, an optical path difference of the light beam having the wavelength λ1 or λ2 at an arbitrary height h from the optical axis L is expressed in a mathematical formula, and is obtained by substituting coefficients shown in Table 3 into the optical path difference expression formula (3).

In this example, the diffraction efficiency of each diffracting ring-shaped zone 21 is around 95% for both the 1st order diffracted light having the wavelength λ1 and the 1st order diffracted light having the wavelength λ2.

FIFTH EXAMPLE

Figure 9:
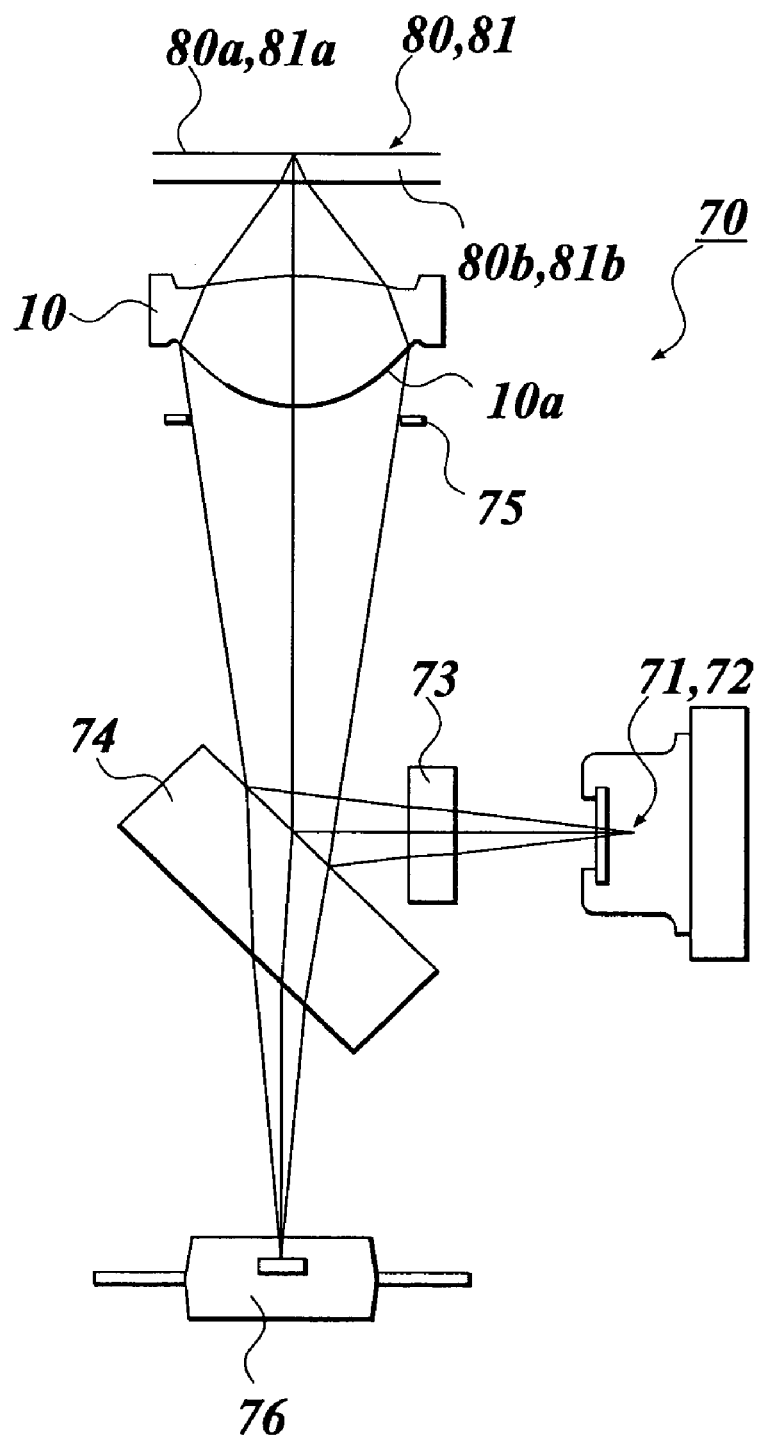
FIG. 9 is a schematic view of an optical pickup device and an optical element according to a fifth example of the first embodiment.

Next, an optical element and an optical pickup device according to a fifth example of the first embodiment of the present invention will be explained with reference to FIG. 9.

In an optical pickup device 70, a light beam having a wavelength λ1 (=655 nm) is emitted from a first semiconductor laser (light source) 71 to a first optical information recording medium (DVD in this example) 80, and a light beam having a wavelength λ2 (=785 nm) is emitted from a second semiconductor laser (light source) 72 to a second optical information recording medium (CD in this example) 81. Thereafter, these light beams are diverging and incident on the objective lens (objective optical element) 10 to converge the light beams on information record planes 80a and 81a of the optical information recording media 80 and 81 respectively. Therefore, information is recorded on each of the information record planes 80*a* and 81*a*, or information recorded on each of the information record planes 80*a* and 81*a* is read out.

Here, the first semiconductor laser 71 and the second semiconductor laser 72 are arranged as a unit of the light source. Therefore, in FIG. 9, the light beam having the wavelength λ1 and the light beam having the wavelength λ2 emitted from the semiconductor lasers are indicated by the same solid lines.

When information is recorded or reproduced for the DVD 80 the light beam having the wavelength λ1 emitted from the first semiconductor laser 71 is transmitted through a diffraction grating 73 and is reflected on a half mirror 74. Thereafter, the light beam having the wavelength λ1 passes through a stop 75 and is converged on the information record plane 80*a* by the objective lens 10 through a protect substrate 80*b* of the DVD 80.

Thereafter, a light beam modulated in an information pit of the information record plane 80*a* and reflected on the information record plane 80*a* again passes through the objective lens 10 the stop 75, the half mirror 74 and a diffraction grating (not shown) and is incident on an optical detector 76. Thereafter, a read-out signal indicating the information recorded in the DVD 80 is obtained from a signal output from the optical detector 76.

When information is recorded or reproduced in/from the CD 81, in the same manner, the light beam having the wavelength λ2 emitted from the second semiconductor laser 72 is transmitted through the diffraction grating 73 and is reflected on the half mirror 74. Thereafter, the light beam having the wavelength λ2 passes through the stop 75 and is converged on the information record plane 81*a* by the objective lens 10 through a protect substrate 81*b* of the CD 81. Here, in FIG. 9, for convenience, the protect substrate 81*b* of the CD 81 and the protect substrate 80*b* of the DVD 80 are indicated by the same drawing.

Thereafter, a light beam modulated in an information pit of the information record plane 81*a* and reflected on the information record plane 81*a* again passes through the objective lens 10 the stop 75, the half mirror 74 and a diffraction grating (not shown) and is incident on the optical detector 76. Thereafter, a read-out signal indicating the information recorded in the CD 81 is obtained from a signal output from the optical detector 76.

Further, a change of the shape of a spot of light formed on the information record plane 80*a* or 81*a* and a change of the amount of light on the information pit due to a positional change of the light are detected in the optical detector 76 to perform the focusing detection and the tracking detection. Thereafter, the objective lens 10 is moved by a two-dimensional actuator (not shown) according to the detection result to make the light beam emitted from the first semiconductor laser 71 or the second semiconductor laser 72 form an image on the information record plane 80*a* or 81*a* of the DVD 80 or the CD 81 and form the image on a prescribed track.

In this example, in the same manner as in the first example, as shown in FIG. 2, the diffracting ring-shaped zones 21 and the optical path difference giving structure 30 are provided in a central region A1 which is placed on an optical surface 10*a* (on the light source side) of the objective lens denoting an optical element of a single lens having both-sided aspherical surfaces and is away from the optical axis by a distance of 1.53 mm or less.

Further, general diffracting ring-shaped zones of the serrate shape are formed on the peripheral region A2, and the diffraction efficiency of the 1st order diffracted light of the light beam having the wavelength λ1 passing through the peripheral region A2 of the diffracting ring-shaped zones is set to approximately 100%.

In each diffracting ring-shaped zone 21, the farther the divided surface 31 is away from the optical axis L, the deeper the divided surface 31 is fallen in the inside of the objective lens 10.

The depth d1 of each divided surface 31 is set so as to give an optical path difference equivalent to one wavelength for the light beam having the wavelength λ2. In other words, an optical path difference equivalent to approximately twice of an wavelength is generated between the light beam having the wavelength λ2 passing through one divided surface 31 and the light beam having the wavelength λ2 passing through an adjacent divided surface 31, and no shift of the wave front between the light beams occurs.

Further, the structure 22 having the diffracting function is set so as to set the diffraction efficiency of the 1st order diffracted light having the wavelength λ2 to approximately 100%.

Lens data of the objective lens 10 is shown in Table 10 and Table 11.

TABLE 10

Fifth example
Focal length: f1 = 2.85 mm, f2 = 2.87 mm
Numerical aperature: NA1 = 0.60, NA2 = 0.47
Magnification in image formation: m = −1/8.0, m = −1/8.1

| i-th surface | Ri | di (655 nm) | ni (655 nm) | di (785 nm) | ni (785 nm) |
|---|---|---|---|---|---|
| 0 |  | 10.0 |  | 10.0 |  |
| 1 | ∞ | 1.25 | 1.51436 | 1.25 | 1.51108 |
| 2 | ∞ | 14.35047 | 1.0 | 14.71823 | 1.0 |
| 3 | 1.92617 | 2.00000 | 1.52915 | 2.00000 | 1.52541 |
| 3' | 1.95441 | −0.00221 | 1.52915 | −0.00221 | 1.52541 |
| 4 | −4.42811 | 1.79967 | 1.0 | 1.33178 | 1.0 |
| 5 | ∞ | 0.60 | 1.57752 | 1.20 | 1.57063 |
| 6 | ∞ |  |  |  |  |

Here, di denotes the displacement from the i-th surface to (i+1)-th surface, and d3' denotes the displacement from third surface to the 3'rd surface.

TABLE 11

Aspherical surface data

Third surface (0 ≦ h < 1.53 mm)
Coefficients of aspherical surface $\kappa = -6.2671 \times 10^{-1}$
$A4 = -3.3952 \times 10^{-3}$
$A6 = +2.2059 \times 10^{-4}$
$A8 = -9.9554 \times 10^{-5}$
$A10 = +1.6761 \times 10^{-5}$
$A12 = -1.3961 \times 10^{-5}$
$A14 = +6.5021 \times 10^{-7}$ Coefficients of optical path difference function
(reference wavelength: 785 nm)

$B2 = +0.0000 \times 10^{0}$
$B4 = -2.1697 \times 10^{-3}$
$B6 = +1.9454 \times 10^{-4}$
$B8 = -5.2252 \times 10^{-5}$
$B10 = -3.8291 \times 10^{-7}$ 3'rd surface (1.53 mm ≦ h)
Coefficients of aspherical surface $\kappa = -5.6435 \times 10^{-1}$
$A4 = -1.4090 \times 10^{-3}$
$A6 = -2.7827 \times 10^{-4}$
$A8 = +1.8506 \times 10^{-6}$
$A10 = -2.3515 \times 10^{-5}$ TABLE 11-continued Aspherical surface data A12 = −1.4489 × 10⁻⁵
A14 = +2.5022 × 10⁻⁶
Coefficients of optical path difference function
(reference wavelength: 655 nm)

B2 = −4.3851 × 10⁻³
B4 = +1.1223 × 10⁻³
B6 = −1.0106 × 10⁻⁴
B8 = −2.1193 × 10⁻⁴
B10 = +3.7070 × 10⁻⁵
Fourth surface
Coefficients of aspherical surface κ = −1.7123 × 10⁺¹
A4 = +5.4029 × 10⁻³
A6 = +1.7869 × 10⁻⁴
A8 = −5.3339 × 10⁻⁴
A10 = −3.7162 × 10⁻⁵
A12 = +3.7817 × 10⁻⁵
A14 = −3.7645 × 10⁻⁶

As shown in Table 10, in the objective lens 10 of this example, in case of the first wavelength λ1=655 nm of light emitted from the first light source, the focal length f=2.85 nm, the image side numerical aperture NA=0.60 and the magnification m=−1/8.0 are set. In case of the second wavelength λ2=785 nm of light emitted from the second light source, the focal length f=2.87 nm, the image side numerical aperture NA=0.47 and the magnification m=−1/8.1 are set.

In Table 10, surface No. 1 and 2 respectively indicate a surface of the diffraction grating 73 on the light source side and a surface of the diffraction grating 73 on the optical information recording medium side. Surface No. 3, 3' and 4 respectively indicate an optical surface of the central region A1 and an optical surface of the peripheral region A2 in the objective lens 10 on the light source side, and an optical surface of the objective lens 10 on the optical information recording medium side. The central region A1 is placed on an optical surface 10*a* of the objective lens on the light source side and is away from the optical axis L by a distance of 1.53 mm or less. The peripheral region A2 is placed on the optical surface 10*a* of the objective lens on the light source side and is away from the optical axis L by a distance higher than 1.53 mm. Surface No. 5 and 6 respectively indicate a surface of the protect substrate 80*b* or 81*b* and the information recording surface 80*a* or 81*a* in the optical information recording medium. Further, Ri indicates a curvature radius, di indicates a displacement from the i-th surface to i+1-th surface in the direction L of the optical axis, and ni indicates a refractive index of the i-th surface.

The third surface, the 3'rd surface and the fourth surface of the objective lens 10 are defined in a mathematical formula are obtained by substituting the coefficients indicated in Tables 10 and 11 into the formula (1). Each surface is formed in an aspherical shape in axially symmetric with respect to the optical axis L.

Further, the pitch of the diffracting ring-shaped zones is defined in a mathematical formula and is obtained by substituting the coefficients indicated in Table 11 into the optical path difference function of the formula (2).

Moreover, the optical path difference in the light beam having the wavelength λ1 or λ2 at an arbitrary height from the optical axis is expressed in a mathematical formula and is obtained by substituting the coefficients indicated in Table 12 into the formula (3).

TABLE 12

| | |
|---|---|
| λi | 785 nm |
| p | −4 |
| N | 1 |
| M | 2 |

In the optical element 10 and the optical pickup device 70 of the this example, the diffraction efficiency of each diffracting ring-shaped zone 21 is around 96% for the 1st order diffracted light having the wavelength λ1, and is approximately 100% for the 1st order diffracted light having the wavelength λ2.

Here, in the optical element 10 and the optical pickup device 70 having only the well-known diffractive structure (diffractive structure of the serrate shape), the diffraction efficiency for the 1st order diffracted light having the wavelength λ1 is around 90%, and the diffraction efficiency for the 1st order diffracted light having the wavelength λ2 is approximately 100%.

Therefore, in the optical element 10 and the optical pickup device 70 of the this example, the amount of light for the light beam having the wavelength λ1 can be increased by around 6% as compared with the well-known diffractive structure.

Figure 6:
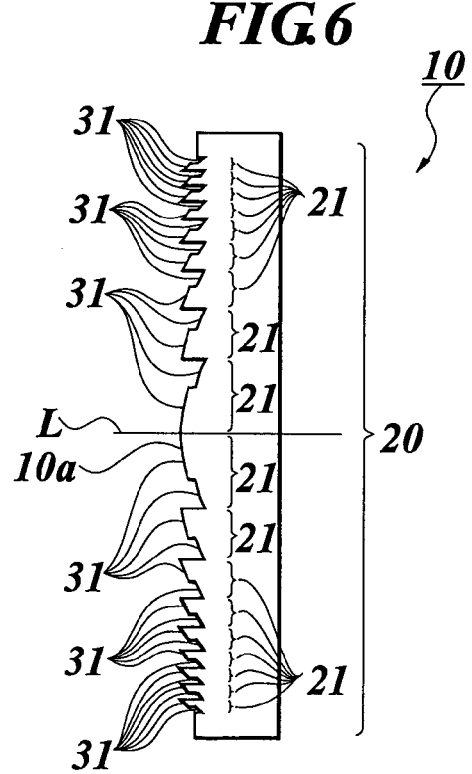
FIG. 6 is a side view showing the configuration of an objective lens.

The optical element according to the first embodiment of the present invention is not limited to those of the first to fifth examples. For example, as shown in FIG. 6, the diffractive structure and the optical path difference giving structures may be arranged on the whole surface of a plane optical element.

Further, it is applicable that the farther the divided surface 31 in each diffracting ring-shaped zone 21 is away from the optical axis L, the higher the height of the divided surface 31 placed so as to be projected toward the light source is.

Figure 7:
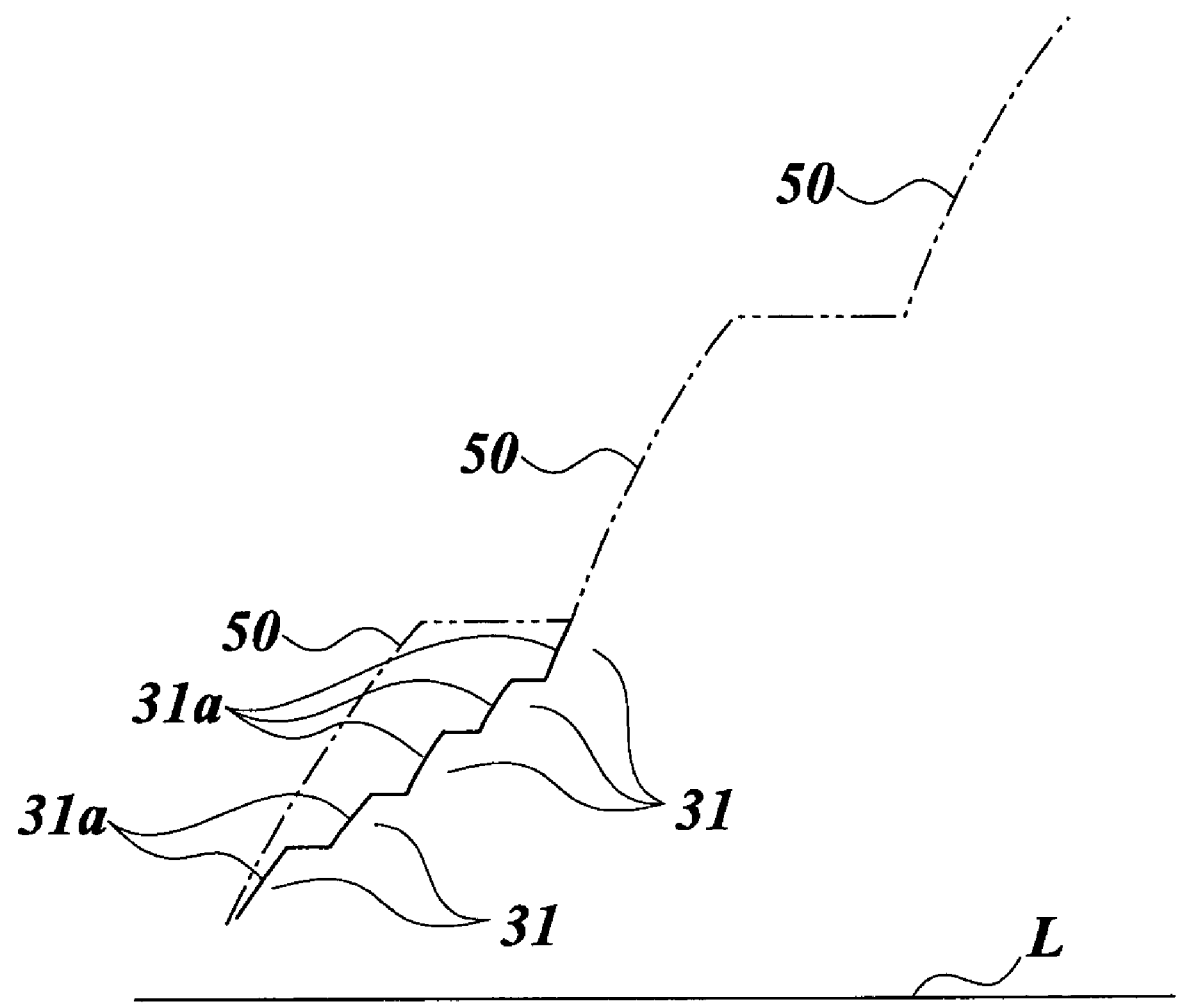
FIG. 7 is an enlarged side view showing the configuration of an objective lens.
Figure 8:
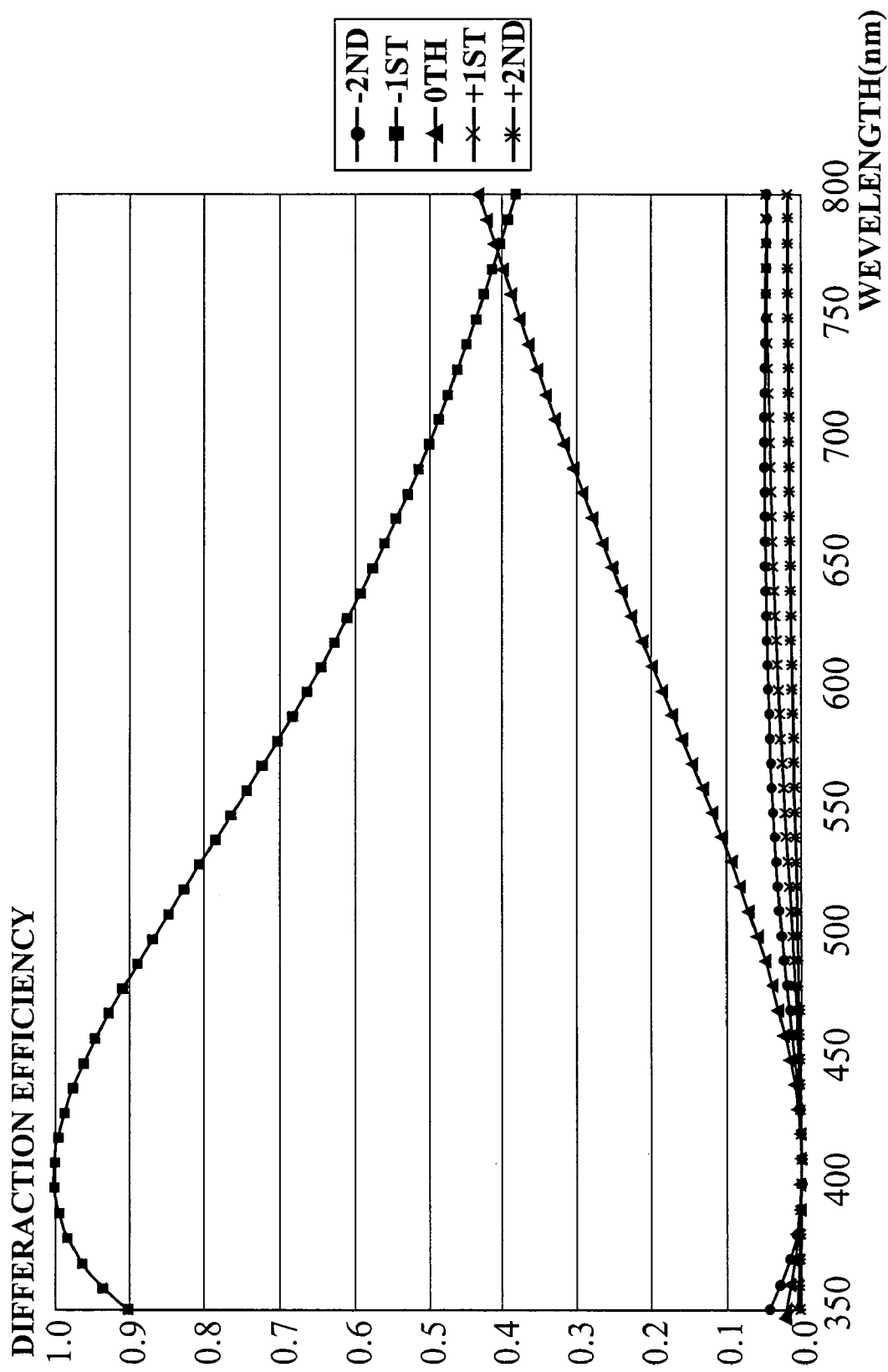
FIG. 8 is a graph showing diffraction efficiencies.

Moreover, in FIG. 2, the shape of each divided surface 31 is obtained by dividing each of the diffracting ring-shaped zones 21 of the serrate at intervals corresponding to the divided surfaces 31 and moving the divided zones in the direction of the optical axis L so as to make each adjacent pair of divided zones have a prescribed optical path difference. However, the first embodiment of the present invention is not limited to this. For example, as shown in FIG. 7, the shape of each divided surface 31 may be obtained by dividing a surface shape of each of a plurality of diffracting ring-shaped zones having a discontinuous surface 150 stepwise along the direction of the optical axis L at intervals corresponding to the divided surfaces 31 and moving the divided ones in the direction of the optical axis L so as to make each adjacent pair of divided ones have a prescribed optical path difference.

As described above, the optical element according to the first embodiment of the present invention may comprise the diffractive structure and the optical path difference giving structures placed on at least a portion of an optical functional surface, the diffractive structure comprises the plurality of structures having diffracting function, which are arranged around the optical axis, and the optical path difference giving structure is formed on the optical ring-shaped zones and having the stepwise discontinuous surface so as to give a prescribed optical path difference to the light beam passing though each ring-shaped zone.

According to the embodiment, because the L-th (M-th) order diffracted light of the light beam having the wavelength λ1 (λ2) can emerge to the first optical information recording medium in a state that the high diffraction efficiency is kept, and the M-th (L-th) order diffracted light of the light beam having the wavelength λ2 (λ1) can emerge to the second optical information recording medium in a state that the high diffraction efficiency is obtained, or the both diffracted lights can emerge to the first and the second optical information recording media respectively at a high diffraction efficiency, it is possible to obtain an optical element and an optical pickup device in which the sufficient amount of light can be obtained according to type of optical information recording medium.

Second Embodiment

Figure 10:
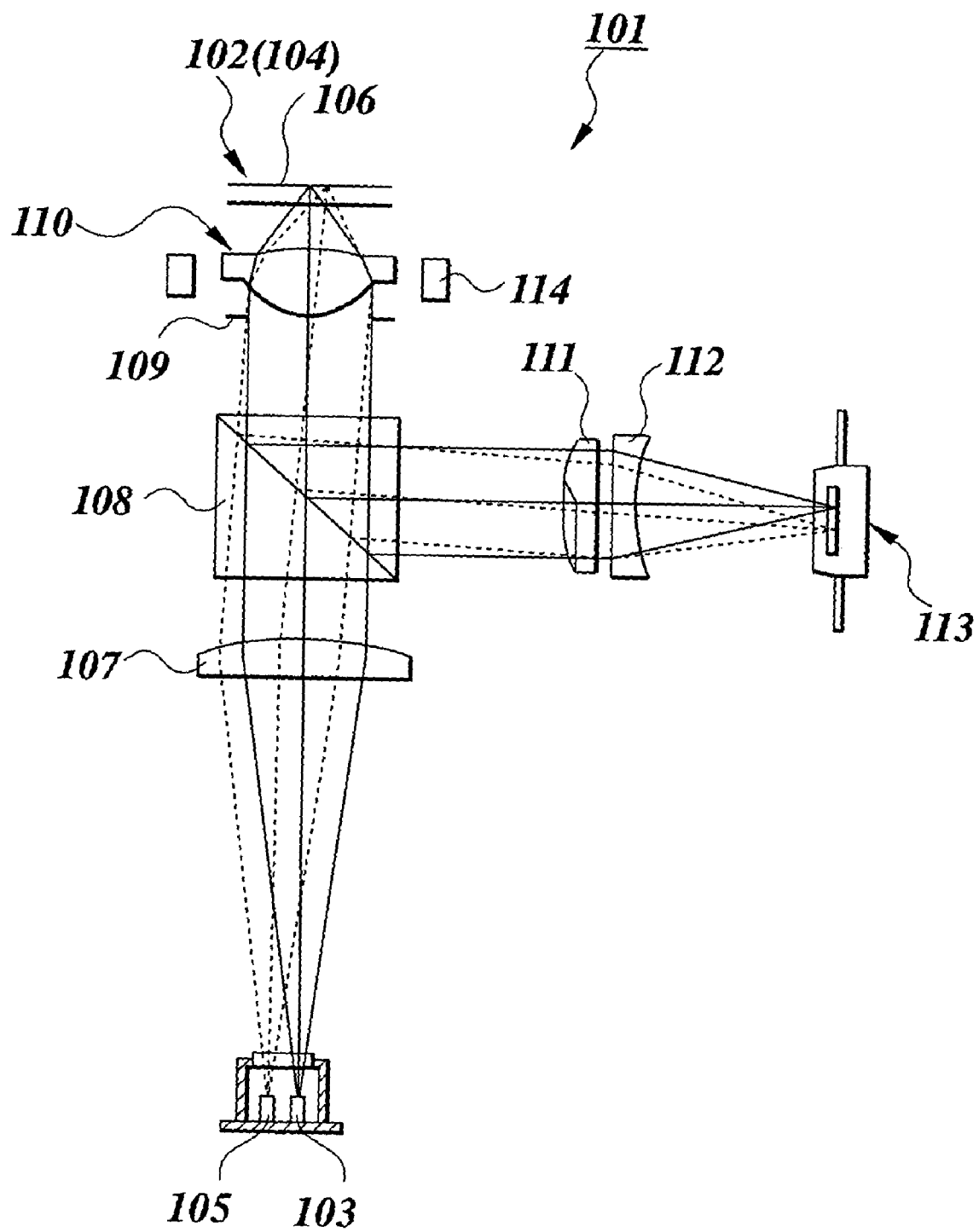
FIG. 10 is a schematic view of an optical pickup device according to a second embodiment of the present invention.

As shown in FIG. 10, in an optical pickup device 101, a light beam having a wavelength λ1 (=650 nm) is emitted from a first semiconductor laser (light source) 103 to a first optical information recording medium (DVD in this embodiment) 102 denoting an optical information recording medium to record or read out information for an information record plane 106 of the first optical information recording medium 102, and a light beam having a wavelength λ2 (=780 nm) is emitted from a second semiconductor laser (light source) 105 to a second optical information recording medium (CD in this embodiment) 104 to record or read out information for an information record plane 106 of the second optical information recording medium 104. The first semiconductor laser 103 and the second semiconductor laser 105 are arranged as a unit of the light source.

When information is recorded or reproduced for the DVD 102, as indicated by solid lines in FIG. 10 the light beam having the wavelength λ1 emitted from the first semiconductor laser 103 is transmitted through a collimator 107 to obtain a parallel light beam denoting parallel rays. Thereafter, the light beam having the wavelength λ1 passes through a beam splitter 108, is stopped down by a stop 109 and is converged on the information record plane 106 by an objective lens 110 through a protect substrate of the DVD 102.

The function of the objective lens 110 for the light beam having the wavelength λ1 will be described later.

Thereafter, a light beam modulated in an information pit and reflected on the information record plane 106 again passes through the objective lens 110 and the stop 109 and is reflected on the beam splitter 108, and astigmatism is given to the light beam in a cylindrical lens 111. Thereafter, the light beam passes through a concave lens 112 and is incident on an optical detector 113. Thereafter, a read-out signal indicating the information recorded in the DVD 102 is obtained from a signal output from the optical detector 113.

When information is recorded or reproduced in/from the CD 104, as indicated by broken lines in FIG. 10 the light beam having the wavelength λ2 emitted from the second semiconductor laser 105 is transmitted through the collimator 107 to obtain a parallel light beam denoting parallel rays. Thereafter, the light beam having the wavelength λ2 passes through the beam splitter 108, is stopped down by the stop 109 and is converged on the information record plane 106 by the objective lens 110 through a protect substrate of the CD 104.

The function of the objective lens 110 for the light beam having the wavelength λ2 will be described later.

Thereafter, a light beam modulated in an information pit and reflected on the information record plane 106 again passes through the objective lens 110 and the stop 109 and is reflected on the beam splitter 108, and astigmatism is given to the light beam in the cylindrical lens 111. Thereafter, the light beam passes through the concave lens 112 and is incident on the optical detector 113. Thereafter, a read-out signal indicating the information recorded in the CD 104 is obtained from a signal output from the optical detector 113.

Further, a change of the shape of a spot of light formed on the information record plane 106 and a change of the amount of light on the information pit due to a positional change of the light are detected in the optical detector 113 to perform the focusing detection and the tracking detection. Thereafter, the objective lens 110 is moved by a two-dimensional actuator 114 according to the detection result to make the light beam emitted from the first semiconductor laser 103 or the second semiconductor laser 105 form an image on the information record plane 106 of the DVD 102 or the CD 104 and form the image on a prescribed track.

Figure 11:
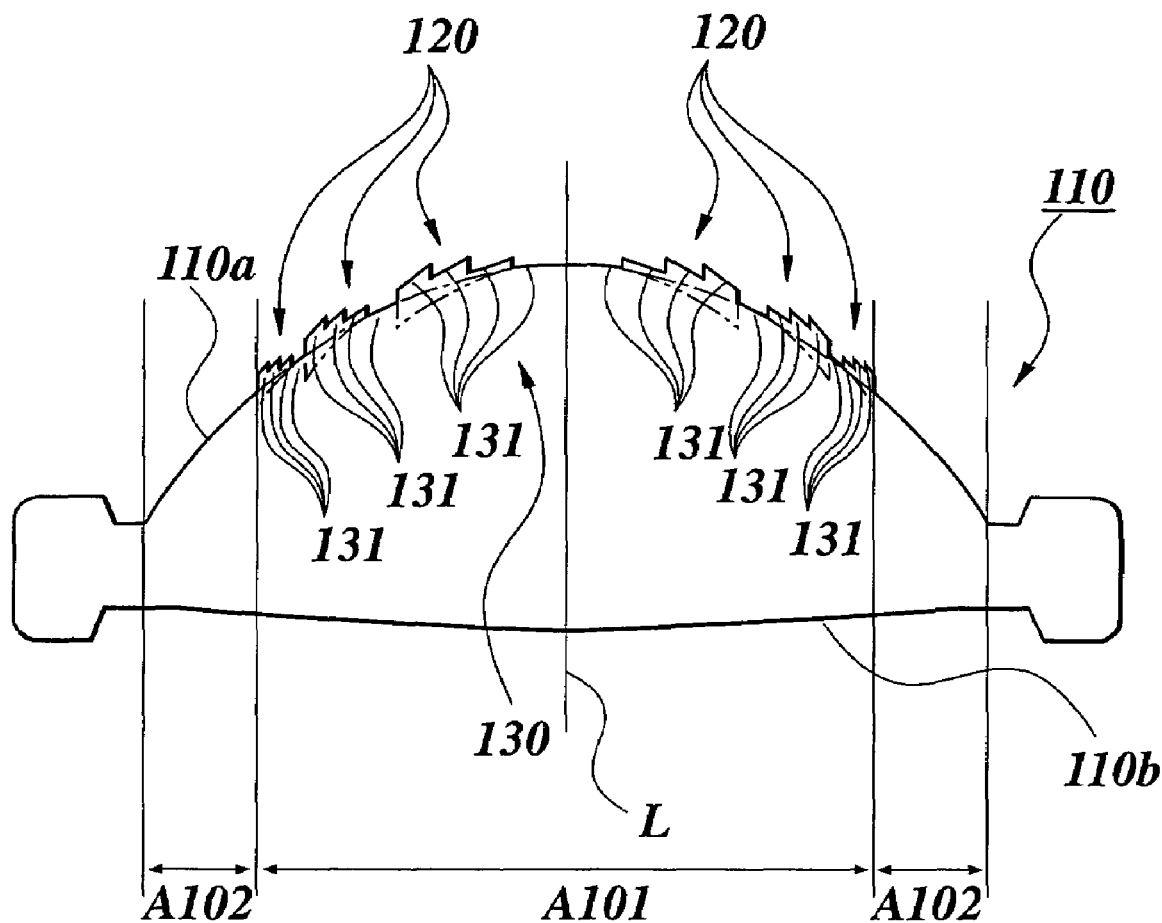
FIG. 11 is a side view showing the configuration of an objective lens.

As shown in FIG. 11, the objective lens 110 denoting an objective optical element is formed of a single lens having two aspherical surfaces and composes an optical system of the optical pickup device. The objective lens 110 has a plurality of diffracting ring-shaped zones 120 and an optical path difference giving structure 130 on an optical surface 110a thereof facing toward the light source.

In detail, the diffracting ring-shaped zones 120 having a discontinuous surface formed in a serrate shape and substantially inclined with respect to the optical surface 110a formed in a prescribed aspherical shape are formed and arranged around the optical axis L. Further, the optical path difference giving structure 130 composed of a plurality of steps 131 is arranged on the optical surfaces of the diffracting ring-shaped zones 120 to give a prescribed optical path difference to the light beam passing through the diffracting ring-shaped zones 120. The shape of the steps 131 forms a stepwise discontinuous surface having risers extending along the optical axis L.

In FIG. 12A, a dot-dash line indicates an outline of an optical surface (optical surface formed in a prescribed aspherical shape) formed in a virtual aspherical shape which is determined by connecting start points of the diffracting ring-shaped zones 120. In FIGS. 12A and 12B, a two-dot-dash line indicates an outline of the diffracting ring-shaped zones 120 concentrically formed in the serrate shape as well-known and thickened as the zone is farther away from the optical axis L.

In FIGS. 12A and 12B, a solid line indicates an actual lens shape including an outline of a stepwise discontinuous surface composed of a plurality of steps 131. The steps 131 of the discontinuous surface are formed on the optical surfaces of the diffracting ring-shaped zones 120.

Further, in FIG. 11 and FIGS. 13 to 16, in the same manner as in FIGS. 12A and 12B, the dot-dash line, the two-dot dash line and the solid line indicate the outlines.

When the refractive index of the objective lens 110 for the wavelength λ2 is expressed by n, the depth (length in the direction of the optical axis L) d1 of each step 131 is approximately equal to a value of λ2/(n−1). Therefore, the optical path difference equivalent to one wavelength λ2 is produced between light beams of the wavelength λ2 passing through each pair of steps 131 adjacent to each other, and no phase difference occurs in the light beams of the wavelength λ2.

Further, a shape of surfaces 131a of the steps 131 is approximately obtained by dividing the surface shape of each diffracting ring-shaped zone 120 at intervals corresponding to those of the steps 131 and moving each divided ones in the direction of the optical axis L.

As described above, in the objective optical element of the present invention, the optical path difference giving structure 130 having the steps 131 of the prescribed depth on the optical functional surface thereof has a function for giving a prescribed optical path difference to light beams passing through the steps 131 of the objective optical element (the objective lens 110). Further, the shape of the surfaces 131a of the steps 131 is formed by dividing the surface shape of each diffracting ring-shaped zone 120 at intervals corresponding to those of the steps 131 and moving each divided ones in the direction of the optical axis L. Therefore, the optical path difference giving structure 130 has a function for extracting the diffracted light having the maximum diffraction efficiency from the light beam having the wavelength λ1 and the light beam having the wavelength λ2.

For example, when a light beam having the wavelength λ1 (650 nm) is incident on the objective optical element 110, a plurality of light beams pass through regions A to E of the objective optical element 110 respectively. In this case, 780 nm−630 nm=130 nm, that is, a phase difference of (⅖)π radians is substantially given to each light beam. As a result, the phase of the light having the wavelength λ1 is changed, and the light is diffracted.

In contrast, when light having the wavelength λ2 (780 nm) is incident on the objective optical element 110, a plurality of light beams pass through the regions A to E of the objective optical element 110 respectively. In this case, a phase difference equivalent to one wavelength λ2 is given to each light beam. Therefore, the phase difference of the light beams passing through the regions A to E substantially becomes zero. Accordingly, the light having the wavelength λ2 is not substantially diffracted in the optical path difference giving structure 130 but is transmitted through the optical path difference giving structure 130.

In this embodiment, as described above, the depth (length in the direction of the optical axis) d1 of each step 131 is set to a length corresponding to the optical path difference equivalent to one wavelength λ2. The shape of the surfaces 131a of the steps 131 is approximately obtained by dividing the surface shape of one diffracting ring-shaped zone 120 at intervals corresponding to those of the steps 131 and moving the divided ones in the direction of the optical axis L. However, the depth d1 of each step 131 and the shape of the surfaces 131a can be appropriately modified according to the wavelengths of the light beams used for the device.

FIRST EXAMPLE

Next, a first example of the optical pickup device 101 and the objective optical element 110 described in this embodiment will be explained.

In this example, as shown in FIG. 11, the diffracting ring-shaped zones 120 and the optical path difference giving structure 130 are provided in a region A101 (hereinafter, named "central region A101") which is placed on one optical surface 110a (on the light source side) of the objective lens 110 denoting an objective optical element of a single lens having both-sided aspherical surfaces and is away from the optical axis by a distance equal to or lower than a prescribed height (1.54 mm or less in this example).

Further, the objective lens 110 has no diffracting ring-shaped zone 120 nor no optical path difference giving structure 130 in a range A102 (hereinafter, called "peripheral region A102") other than the central region A101 on the optical surface 110a which is on the light source side. Therefore, the objective lens 110 has a function of a normal refractive lens in the peripheral region A102.

Each step 131 formed on one diffracting ring-shaped zone 120 is protruded toward the side of the light source. The farther the step 131 is away from the optical axis L, the more the step 131 is protruded toward the light source.

Lens data of the objective lens 110 is shown in Table 13 and Table 14.

TABLE 13

First example
f1 = 3.05 mm, f2 = 3.07 mm
NA1 = 0.60, NA2 = 0.50

| i-th surface | Ri | di (655 nm) | ni (655 nm) | di (785 nm) | ni (785 nm) |
|---|---|---|---|---|---|
| 0 |  | ∞ |  |  |  |
| 1 | ∞ | 0.0 | 1.0 | 0.0 | 1.0 |
| 2 | 1.90379 | 1.80000 | 1.5409 | 1.80000 | 1.5372 |
| 2' | 1.90379 | 0.00000 | 1.5409 | 0.00000 | 1.5372 |
| 3 | −8.26428 | 1.62791 | 1.0 | 1.26273 | 1.0 |
| 4 | ∞ | 0.6 | 1.5775 | 1.2 | 1.5706 |
| 5 | ∞ |  |  |  |  |

Here, di denotes the displacement from the i-th surface to the (i+1)-th surface, and d2' denotes the displacement from the second surface to the 2'nd surface.

As shown in Table 13, in the objective lens 110 of this example, in case of the use reference wavelength λ1=655 nm, the focal length f=3.05 nm and the image side numerical aperture NA=0.60 are set. In case of the use reference wavelength λ2=785 nm, the focal length f=3.07 nm and the image side numerical aperture NA=0.50 are set.

The second surface in Table 13 denotes the optical surface 110a of the objective lens 110 on the light source side in the central region A101 less than the height h of 1.544 mm from the optical axis L. The 2'nd surface in Table 13 denotes the optical surface 110a of the objective lens 110 on the light source side in the peripheral region A102 equal to or more than the height h of 1.544 mm from the optical axis L. The third surface in Table 13 denotes the optical surface 10b of the objective lens 110 on the side of the optical information recording medium. The fourth surface denotes the surface of the protect substrate of the optical information recording medium 102 or 104. The fifth surface denotes the information record plane 106. Further, Ri denotes a curvature radius, di denotes the displacement in the direction of the optical axis from the i-th surface to the (i+1)-th surface, and ni denotes a refractive index of each surface.

The second, 2'nd and third surfaces of the objective lens 110 are defined in a mathematical formula, are obtained by substituting coefficients shown in Tables 13 and 14 into a following aspherical shape formula (4), and are respectively formed in an aspherical shape in axially symmetric with respect to the optical axis L.

(Aspherical Shape Formula)

$$X(h) = \frac{(h^2/R)}{1 + \sqrt{1-(1+\kappa)(h/R)^2}} + \sum_{i=0}^{9} A_{2i} h^{2i} \qquad (4)$$

Here, X(h) denotes an axis in the direction of the optical axis L (the propagating direction of light is positive), κ denotes a conic constant, and $A_{2i}$ denotes coefficients of the aspherical surfaces.

TABLE 14

Aspherical surface data

Second surface ($0 \leq h < 1.54$ mm)
Coefficients of aspherical surface $\kappa = -6.6055 \times 10^{-1}$
$A4 = +1.9581 \times 10^{-3}$
$A6 = +5.5582 \times 10^{-4}$
$A8 = -7.0876 \times 10^{-5}$
$A10 = +9.9597 \times 10^{-6}$
$A12 = +1.3026 \times 10^{-5}$
$A14 = -4.3527 \times 10^{-6}$ Coefficients of optical path difference function
(reference wavelength: 785 nm)

$B4 = -3.1976 \times 10^{-4}$
$B6 = -4.4614 \times 10^{-5}$
$B8 = +4.0326 \times 10^{-6}$
$B10 = -1.2103 \times 10^{-6}$ 2'nd surface ($1.54$ mm $\leq h$)
Coefficients of aspherical surface $\kappa = -6.6055 \times 10^{-1}$
$A4 = +1.9581 \times 10^{-3}$
$A6 = +5.5582 \times 10^{-4}$
$A8 = -7.0876 \times 10^{-5}$
$A10 = +9.9597 \times 10^{-6}$
$A12 = +1.3026 \times 10^{-5}$
$A14 = -4.3527 \times 10^{-6}$ Third surface
Coefficients of aspherical surface $\kappa = -3.6454 \times 10^{+1}$
$A4 = +4.9302 \times 10^{-3}$
$A6 = +6.5608 \times 10^{-4}$
$A8 = -3.9703 \times 10^{-4}$
$A10 = -9.3653 \times 10^{-5}$
$A12 = +3.8558 \times 10^{-5}$
$A14 = -3.5658 \times 10^{-6}$ Further, the pitch of the diffracting ring-shaped zones 120 is determined in a mathematical formula and is obtained by substituting coefficients shown in Table 14 into a following optical path difference function (5).

(Optical Path Difference Function)

$$\phi(h) = \sum_{i=0}^{5} B_{2i} h^{2i} \quad (5)$$

Here, $B_{2i}$ is coefficients of the optical path difference function.

Moreover, an optical path difference of the light beam having the wavelength $\lambda 1$ or $\lambda 2$ at an arbitrary height h from the optical axis L is expressed in a following optical path difference expression formula (6).

(Optical Path Difference Expression Formula)

$$\phi'(h) = \quad (6)$$
$$N \times \text{MOD}\{\phi(h)/\lambda\} - p \times \text{INT}[M \times \text{MOD}\{\phi(h)/\lambda\}] \times \frac{\lambda_i}{\lambda} \times \frac{n-1}{n_i - 1}$$

h: height from optical axis
$A_{2i}$: aspherical coefficients
$B_{2i}$: coefficients of optical path difference function
MOD: decimal fraction of a numeral
INT: integer of a numeral $\lambda$: reference wavelength
n: refractive index at reference wavelength
$\lambda i$: wavelength in a range of $\lambda 1 \pm 30$ nm or $\lambda 2 \pm 30$ nm
$n_i$: refractive index at $\lambda i$
p: a prescribed integer (optical path difference per one step expressed by a unit of $\lambda$)
N: diffraction order
M: the number of divided surfaces in one diffracting ring-shaped zone (the number of steps)

Further, values of $\lambda i$, p, N and M are shown in Table 15

TABLE 15

Values of $\lambda i$, p, N and M in examples

|  | 1st Example | 2nd Example | 3rd Example |
|---|---|---|---|
| $\lambda i$ | 785 nm | 655 nm | 655 nm |
| p | 1 | 1 | 1 |
| N | 1 | 1 | 1 |
| M | 6 | 3 | 3 |

SECOND EXAMPLE

Next, a second example of the optical pickup device 101 and the objective optical element 110 described in this embodiment will be explained.

In this example, in the same manner as in the first example, as shown in FIG. 11, the diffracting ring-shaped zones 120 and the optical path difference giving structure 130 are provided in a central region A101 which is placed on the optical surface 110a (on the light source side) of the objective lens 110 denoting an objective optical element of a single lens having both-sided aspherical surfaces and is away from the optical axis by a distance of 1.60 mm or less.

Further, the objective lens 110 has no diffracting ring-shaped zone 120 nor no optical path difference giving structure 130 in the peripheral region A102. Therefore, the objective lens 110 has a function of a normal refractive lens in the peripheral region A102.

Each step 131 formed on one diffracting ring-shaped zone 120 is protruded toward the side of the light source. The farther the step 131 is away from the optical axis L, the more the step 131 is protruded toward the light source.

Lens data of the objective lens 110 is shown in Table 16 and Table 17.

TABLE 16

Second example
f1 = 2.40 mm, f2 = 2.46 mm
NA1 = 0.85, NA2 = 0.65

| i-th surface | Ri | di (405 nm) | ni (405 nm) | di (655 nm) | ni (655 nm) |
|---|---|---|---|---|---|
| 0 |  | ∞ |  | ∞ |  |
| 1 | ∞ | 0.0 | 1.0 | 0.0 | 1.0 |
| 2 | 1.58147 | 3.30000 | 1.52491 | 3.33000 | 1.50673 |
| 2' | 1.58147 | 0.00000 | 1.52491 | 0.00000 | 1.50673 |
| 3 | −1.74478 | 0.61368 | 1.0 | 0.35010 | 1.0 |
| 4 | ∞ | 0.1 | 1.61949 | 0.6 | 1.57752 |
| 5 | ∞ |  |  |  |  |

Here, di denotes the displacement from the i-th surface to the (i+1)-th surface, and d2' denotes the displacement from the second surface to the 2'nd surface.

TABLE 17

Aspherical surface data

Second surface ($0 \leq h < 1.6$ mm)
Coefficients of aspherical surface $\kappa = -8.8074 \times 10^{-1}$
$A4 = +1.3340 \times 10^{-2}$
$A6 = +4.8710 \times 10^{-4}$
$A8 = +9.1829 \times 10^{-4}$
$A10 = -3.4515 \times 10^{-4}$
$A12 = +1.1204 \times 10^{-5}$
$A14 = -1.7646 \times 10^{-5}$
$A16 = +8.9992 \times 10^{-7}$
$A18 = +3.3286 \times 10^{-7}$
$A20 = -7.1084 \times 10^{-8}$ Coefficients of optical path difference function
(reference wavelength: 655 nm)

$B2 = -1.5171 \times 10^{-4}$
$B4 = -7.7059 \times 10^{-4}$
$B6 = -1.0015 \times 10^{-4}$
$B8 = +2.2614 \times 10^{-6}$
$B10 = -7.6248 \times 10^{-6}$ 2'nd surface (1.6 mm $\leq h$)
Coefficients of aspherical surface $\kappa = -9.3044 \times 10^{-1}$
$A4 = +1.4882 \times 10^{-2}$
$A6 = +1.9830 \times 10^{-3}$
$A8 = +5.3310 \times 10^{-4}$
$A10 = -1.7360 \times 10^{-4}$
$A12 = +6.5343 \times 10^{-5}$
$A14 = -2.8939 \times 10^{-5}$
$A16 = +8.9992 \times 10^{-7}$
$A18 = +3.3286 \times 10^{-7}$
$A20 = -7.1084 \times 10^{-8}$ Third surface
Coefficients of aspherical surface $\kappa = -2.6543 \times 10^{+1}$
$A4 = +8.7535 \times 10^{-2}$
$A6 = -7.0881 \times 10^{-2}$
$A8 = +2.0730 \times 10^{-2}$
$A10 = +4.4173 \times 10^{-3}$
$A12 = -4.4727 \times 10^{-3}$
$A14 = +7.6083 \times 10^{-4}$
$A16 = -1.6728 \times 10^{-5}$
$A18 = +5.9117 \times 10^{-5}$
$A20 = -1.7630 \times 10^{-5}$ As shown in Table 16, in the objective lens 110 of this example, in case of the use reference wavelength $\lambda 1$=405 nm, the focal length f=2.40 nm and the image side numerical aperture NA=0.85 are set. In case of the use reference wavelength $\lambda 2$=655 nm, the focal length f=2.46 nm and the image side numerical aperture NA=0.65 are set.

The second, 2'nd and third surfaces of the objective lens 110 are defined in a mathematical formula, are obtained by substituting coefficients shown in Tables 16 and 17 into the aspherical shape formula (4), and are respectively formed in an aspherical shape in axially symmetric with respect to the optical axis L.

Further, the pitch of the diffracting ring-shaped zones 120 is determined in a mathematical formula, and is obtained by substituting coefficients shown in Table 17 into the optical path difference function (5).

Moreover, an optical path difference of the light beam having the wavelength $\lambda 1$ or $\lambda 2$ at an arbitrary height h from the optical axis L is expressed in a mathematical formula, and is obtained by substituting coefficients shown in Table 15 into the optical path difference expression formula (6).

THIRD EXAMPLE

Next, a third example of the optical pickup device 101 and the objective optical element 110 described in this embodiment will be explained.

Figure 13:
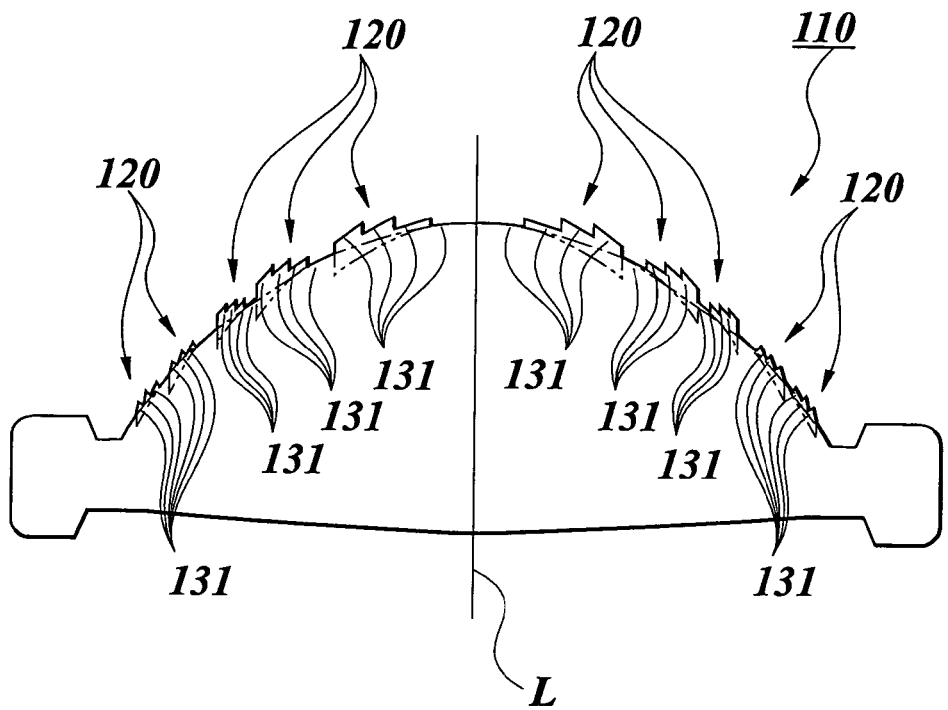
FIG. 13 is a side view showing the configuration of an objective lens.

In this example, as shown in FIG. 13, the diffracting ring-shaped zones 120 and the optical path difference giving structure 130 are provided on one whole optical surface 110a (on the light source side) of the objective lens 110 denoting an objective optical element of a single lens having both-sided aspherical surfaces.

Each step 131 formed on one diffracting ring-shaped zone 120 is protruded toward the side of the light source. The farther the step 131 is away from the optical axis L, the more the step 131 is protruded toward the light source.

Lens data of the objective lens 110 is shown in Table 18 and Table 19.

TABLE 18

Third example
f1 = 2.40 mm, f2 = 2.48 mm
NA1 = 0.65, NA2 = 0.65

| i-th surface | Ri | di (405 nm) | ni (405 nm) | di (655 nm) | ni (655 nm) |
|---|---|---|---|---|---|
| 0 |  | ∞ |  | ∞ |  |
| 1 | ∞ | 0.0 | 1.0 | 0.0 | 1.0 |
| 2 | 1.49773 | 1.55000 | 1.52491 | 1.55000 | 1.50673 |
| 3 | −5.10465 | 1.17447 | 1.0 | 1.23544 | 1.0 |
| 4 | ∞ | 0.6 | 1.61949 | 0.6 | 1.57752 |
| 5 | ∞ |  |  |  |  |

Here, di denotes the displacement from the i-th surface to the (i+1)-th surface.

TABLE 19

Aspherical surface data

Second surface
Coefficients of aspherical surface $\kappa = -9.3044 \times 10^{-1}$
$A4 = +1.4882 \times 10^{-2}$
$A6 = +1.9830 \times 10^{-3}$
$A8 = +5.3310 \times 10^{-4}$
$A10 = -1.7360 \times 10^{-4}$
$A12 = +6.5343 \times 10^{-5}$
$A14 = -2.8939 \times 10^{-5}$ Coefficients of optical path difference function
(reference wavelength: 655 nm)

$B2 = -1.5487 \times 10^{-4}$
$B4 = -8.7629 \times 10^{-5}$
$B6 = -1.5458 \times 10^{-4}$
$B8 = +6.8515 \times 10^{-5}$
$B10 = -1.4578 \times 10^{-5}$ Third surface
Coefficients of aspherical surface $\kappa = -2.4454 \times 10^{+1}$
$A4 = +1.5290 \times 10^{-2}$
$A6 = +1.4817 \times 10^{-3}$
$A8 = -6.3608 \times 10^{-3}$
$A10 = +3.0146 \times 10^{-3}$
$A12 = -6.6013 \times 10^{-4}$
$A14 = +5.7601 \times 10^{-5}$ As shown in Table 18, in the objective lens 110 of this example, in case of the use reference wavelength $\lambda 1$=405 nm, the focal length f=2.40 nm and the image side numerical aperture NA=0.65 are set. In case of the use reference wavelength $\lambda 2$=655 nm, the focal length f=2.48 nm and the image side numerical aperture NA=0.65 are set.

The second and third surfaces of the objective lens 110 are defined in a mathematical formula, are obtained by substituting coefficients shown in Tables 18 and 19 into the aspherical shape formula (4), and are respectively formed in an aspherical shape in axially symmetric with respect to the optical axis L.

Further, the pitch of the diffracting ring-shaped zones 120 is determined in a mathematical formula, and is obtained by substituting coefficients shown in Table 19 into the optical path difference function (5).

Moreover, an optical path difference of the light beam having the wavelength $\lambda 1$ or $\lambda 2$ at an arbitrary height h from the optical axis L is expressed in a mathematical formula, and is obtained by substituting coefficients shown in Table 15 into the optical path difference expression formula (6).

FOURTH EXAMPLE

Figure 18:
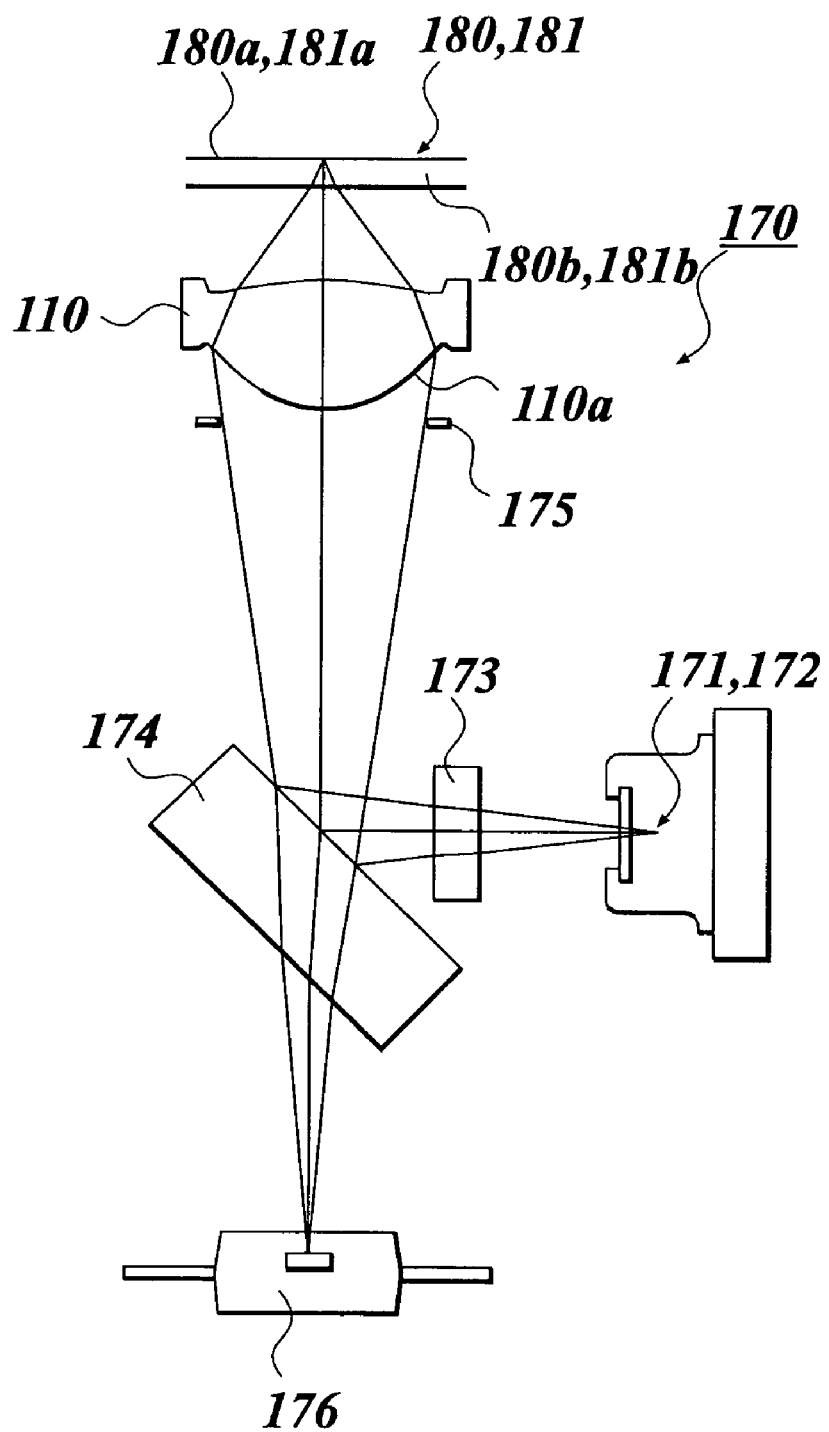
FIG. 18 is a schematic view of an optical pickup device according to a fourth example of the second embodiment.

Next, an objective optical element and an optical pickup device according to a fourth example of the second embodiment of the present invention will be explained with reference to FIG. 18.

In an optical pickup device 170, a light beam having a wavelength $\lambda 1$ (=655 nm) is emitted from a first semiconductor laser (light source) 171 to a first optical information recording medium (DVD in this example) 180, and a light beam having a wavelength $\lambda 2$ (=785 nm) is emitted from a second semiconductor laser (light source) 172 to a second optical information recording medium (CD in this example) 181. Thereafter, these light beams are diverging and incident on the objective lens (objective optical element) 110 to converge the light beams on information record planes 180a and 181a of the optical information recording media 180 and 181 respectively. Therefore, information is recorded on each of the information record planes 180a and 181a, or information recorded on each of the information record planes 180a and 181a is read out.

Here, the first semiconductor laser 171 and the second semiconductor laser 172 are arranged as a unit of the light source. Therefore, in FIG. 18, the light beam having the wavelength $\lambda 1$ and the light beam having the wavelength $\lambda 2$ emitted from the semiconductor lasers are indicated by the same solid lines.

When information is recorded or reproduced for the DVD 180, the light beam having the wavelength $\lambda 1$ emitted from the first semiconductor laser 171 is transmitted through a diffraction grating 173 and is reflected on a half mirror 174. Thereafter, the light beam having the wavelength $\lambda 1$ passes through a stop 175 and is converged on the information record plane 180a by the objective lens 110 through a protect substrate 180b of the DVD 180.

Thereafter, a light beam modulated in an information pit of the information record plane 180a and reflected on the information record plane 180a again passes through the objective lens 110 the stop 175, the half mirror 174 and a diffraction grating (not shown) and is incident on an optical detector 176. Thereafter, a read-out signal indicating the information recorded in the DVD 180 is obtained from a signal output from the optical detector 176.

When information is recorded or reproduced for the CD 181, in the same manner, the light beam having the wavelength $\lambda 2$ emitted from the second semiconductor laser 172 is transmitted through the diffraction grating 173 and is reflected on the half mirror 174. Thereafter, the light beam having the wavelength $\lambda 2$ is stopped down by the stop 175 and is converged on the information record plane 181a by the objective lens 110 through a protect substrate 181b of the CD 181. Here, in FIG. 18, for convenience, the protect substrate 181b of the CD 181 and the protect substrate 180b of the DVD 180 are indicated by the same drawing.

Thereafter, a light beam modulated in an information pit of the information record plane 181a and reflected on the information record plane 181a again passes through the objective lens 110 the stop 175, the half mirror 174 and a diffraction grating (not shown) and is incident on the optical detector 176. Thereafter, a read-out signal indicating the information recorded in the CD 181 is obtained from a signal output from the optical detector 176.

Further, a change of the shape of a spot of light formed on the information record plane 180a or 181a and a change of the amount of light on the information pit due to a positional change of the light are detected in the optical detector 176 to perform the focusing detection and the tracking detection. Thereafter, the objective lens 110 is moved by a two-dimensional actuator (not shown) according to the detection result to make the light beam emitted from the first semiconductor laser 171 or the second semiconductor laser 172 form an image on the information record plane 180a or 181a of the DVD 180 or the CD 181 and form the image on a prescribed track.

Figure 16:
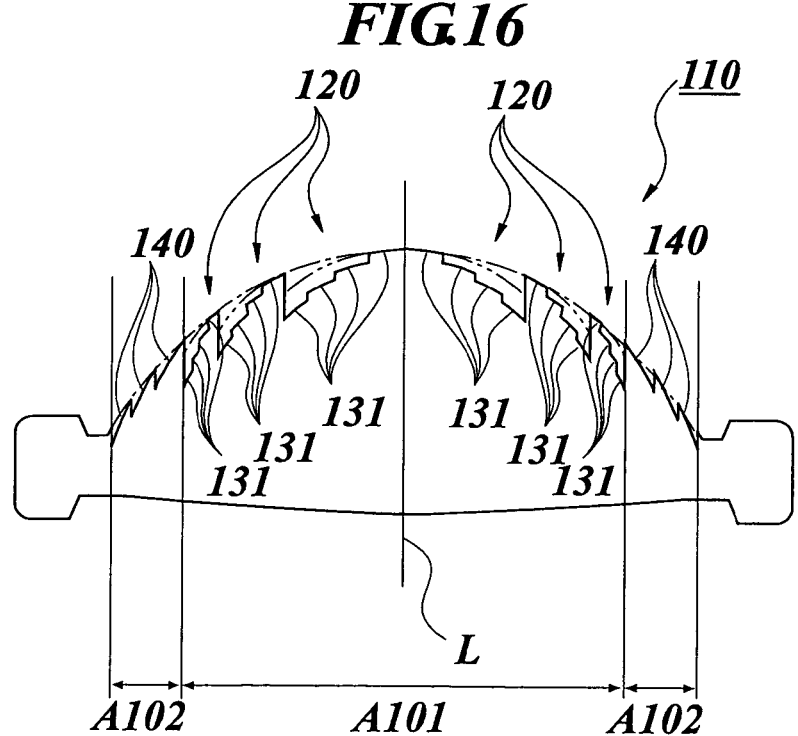
FIG. 16 is side view showing the configuration of an objective lens.

As shown in FIG. 16, the objective lens 110, formed of a single lens having two aspherical surfaces and functioning as an objective optical element, has the diffracting ring-shaped zones 120 and the optical path difference giving structure 130 in the central region A101 less than the height of 1.53 mm from the optical axis L on the optical surface 110a placed on one side (light source side) of the objective lens 110.

In each diffracting ring-shaped zone 120, the farther each step 131 is away from the optical axis L, the deeper the step 131 is fallen in the inside of the objective lens 110.

The depth d1 (length in the direction of the optical axis) of each step 131 is set to produce an optical path difference of one wavelength $\lambda 2$. In detail, the optical path difference of two wavelengths $\lambda 2$ is produced between two light beams respectively passing through each pair of steps 131 adjacent to each other, and no phase difference occurs between the light beams.

Further, the objective lens 110 has a plurality of diffracting ring-shaped zones 140 formed in the serrate shape in the peripheral region A102. The diffracting ring-shaped zones 140 are set on condition that the diffraction efficiency of the 1st order diffracted light of the light beam having the wavelength $\lambda 1$, which passes through the peripheral region A102, becomes approximately 100%.

Lens data of the objective lens 110 is shown in Table 20 and Table 21.

TABLE 20

Fourth example
Focal length: f1 = 2.85 mm, f2 = 2.87 mm
Numerical aperture: NA1 = 0.60, NA2 = 0.47
Magnification in image formation: m = −1/8.0, m = −1/8.1

| i-th surface | Ri | di (655 nm) | ni (655 nm) | di (785 nm) | ni (785 nm) |
|---|---|---|---|---|---|
| 0 |  | 10.0 |  | 10.0 |  |
| 1 | ∞ | 1.25 | 1.51436 | 1.25 | 1.51108 |
| 2 | ∞ | 14.32983 | 1.0 | 14.69831 | 1.0 |
| 3 | 1.96270 | 2.00000 | 1.52915 | 2.00000 | 1.52541 |

TABLE 20-continued

Fourth example
Focal length: f1 = 2.85 mm, f2 = 2.87 mm
Numerical aperture: NA1 = 0.60, NA2 = 0.47
Magnification in image formation: m = −1/8.0, m = −1/8.1

| i-th surface | Ri | di (655 nm) | ni (655 nm) | di (785 nm) | ni (785 nm) |
|---|---|---|---|---|---|
| 3' | 1.89863 | 0.01902 | 1.52915 | 0.01902 | 1.52541 |
| 4 | −4.18241 | 1.82034 | 1.0 | 1.45169 | 1.0 |
| 5 | ∞ | 0.60 | 1.57752 | 1.20 | 1.57063 |
| 6 | ∞ | | | | |

Here, di denotes the displacement from the i-th surface to the (i+1)-th surface, and d3' denotes the displacement from third surface to the 3'rd surface.

TABLE 21

Aspherical surface data

Third surface ($0 \leq h < 1.53$ mm)
Coefficients of aspherical surface $\kappa = -5.0059 \times 10^{-1}$
$A4 = +7.9575 \times 10^{-4}$
$A6 = -7.8693 \times 10^{-4}$
$A8 = +1.5920 \times 10^{-4}$
$A10 = -3.9369 \times 10^{-5}$
$A12 = +2.0484 \times 10^{-6}$
$A14 = -1.39210 \times 10^{-6}$ Coefficients of optical path difference function
(reference wavelength: 785 nm)

$B2 = +2.2104 \times 10^{-4}$
$B4 = +1.0317 \times 10^{-3}$
$B6 = -4.0389 \times 10^{-5}$
$B8 = +2.8081 \times 10^{-5}$
$B10 = -3.0709 \times 10^{-6}$ 3' rd surface (1.53 mm $\leq h$)
Coefficients of aspherical surface $\kappa = -6.2883 \times 10^{-1}$
$A4 = -5.1398 \times 10^{-3}$
$A6 = -1.1353 \times 10^{-3}$
$A8 = +2.8133 \times 10^{-4}$
$A10 = +8.1535 \times 10^{-5}$
$A12 = -1.2876 \times 10^{-5}$
$A14 = -2.7584 \times 10^{-6}$ Coefficients of optical path difference function
(reference wavelength: 655 nm)

$B2 = +1.9163 \times 10^{-2}$
$B4 = -1.0423 \times 10^{-2}$
$B6 = +5.0497 \times 10^{-4}$
$B8 = +5.7635 \times 10^{-4}$
$B10 = -8.9447 \times 10^{-5}$ Fourth surface
Coefficients of aspherical surface $\kappa = -2.0796 \times 10^{+1}$
$A4 = +1.1878 \times 10^{-3}$
$A6 = +1.4087 \times 10^{-3}$
$A8 = -7.1284 \times 10^{-4}$
$A10 = -1.5580 \times 10^{-5}$
$A12 = +4.4903 \times 10^{-5}$
$A14 = -6.4634 \times 10^{-6}$ As shown in Table 20, in the objective lens 110 of this example, in case of the first wavelength λ1=655 nm, the focal length f=2.85 nm, the image side numerical aperture NA=0.60 and magnification m=−1/8.0 are set. In case of the second wavelength λ2=785 nm, the focal length f=2.87 nm, the image side numerical aperture NA=0.47 and the magnification m=−1/8.1 are set.

In Table 20, surface No. 1 and 2 respectively indicate a surface of the diffraction grating 173 on the light source side and a surface of the diffraction grating 173 on the optical information recording medium side. Surface No. 3, 3' and 4 respectively indicate an optical surface of a central region A101 and an optical surface of a peripheral region A102 in the objective lens 110 on the light source side, and an optical surface of the objective lens 110 on the optical information recording medium side. The central region A101 is defined as a region in which a height h from the optical axis is equal to or lower than 1.53 mm. The peripheral region A102 is defined as a region in which a height h from the optical axis is higher than 1.53 mm. Surface No. 5 and 6 respectively indicate a surface of the protect substrate 180b or 181b and the information recording surface 180a or 181a in the optical information recording medium. Further, Ri indicates a curvature radius, di indicates a displacement from the i-th surface to i+1-th surface in the direction L of the optical axis, and ni indicates a refractive index of the i-th surface.

The third surface, the 3'rd surface and the fourth surface of the objective lens 110 are defined in a mathematical formula and are obtained by substituting the coefficients indicated in Tables 20 and 21 into the formula (4). Each surface is formed in an aspherical shape in axially symmetric with respect to the optical axis L.

Further, the pitch of the diffracting ring-shaped zones is defined in a mathematical formula and is obtained by substituting the coefficients indicated in Table 21 into the optical path difference function of the formula (5).

Moreover, the optical path difference in the light beam having the wavelength λ1 or λ2 at an arbitrary height from the optical axis is expressed in a mathematical formula and is obtained by substituting the coefficients indicated in Table 22 into the formula (6).

TABLE 22

| λi | 785 nm |
|---|---|
| p | −1 |
| N | 1 |
| M | 4 |

Figure 14:
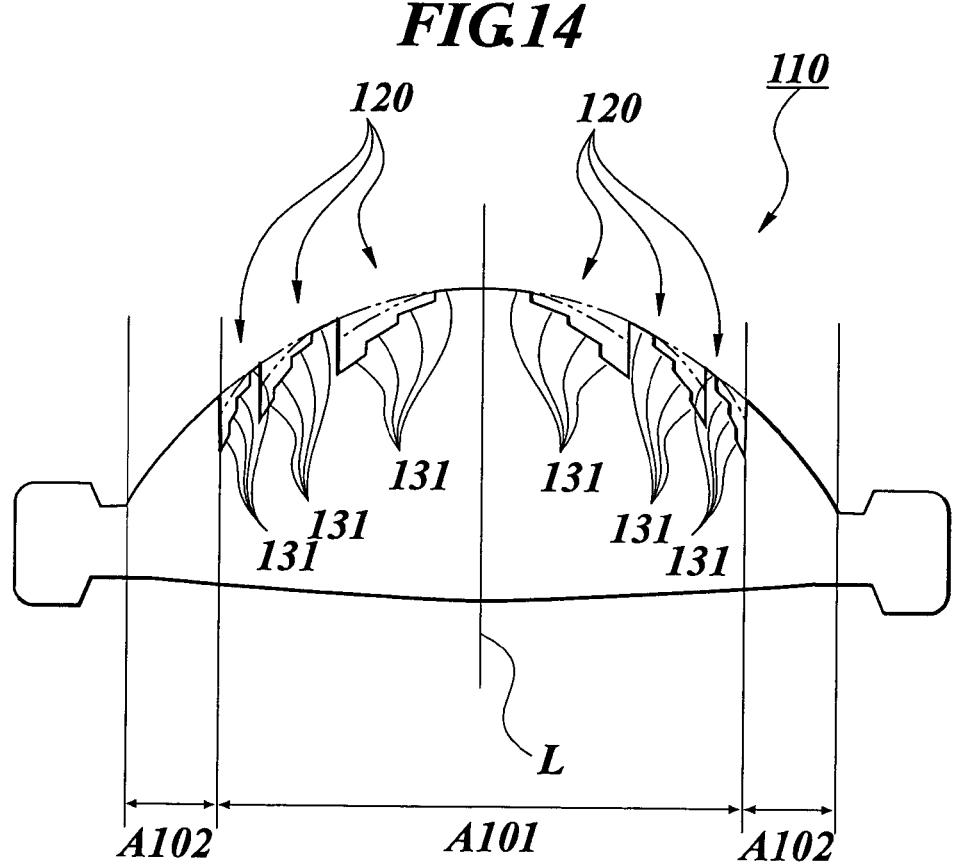
FIG. 14 is a side view showing the configuration of an objective lens.
Figure 15:
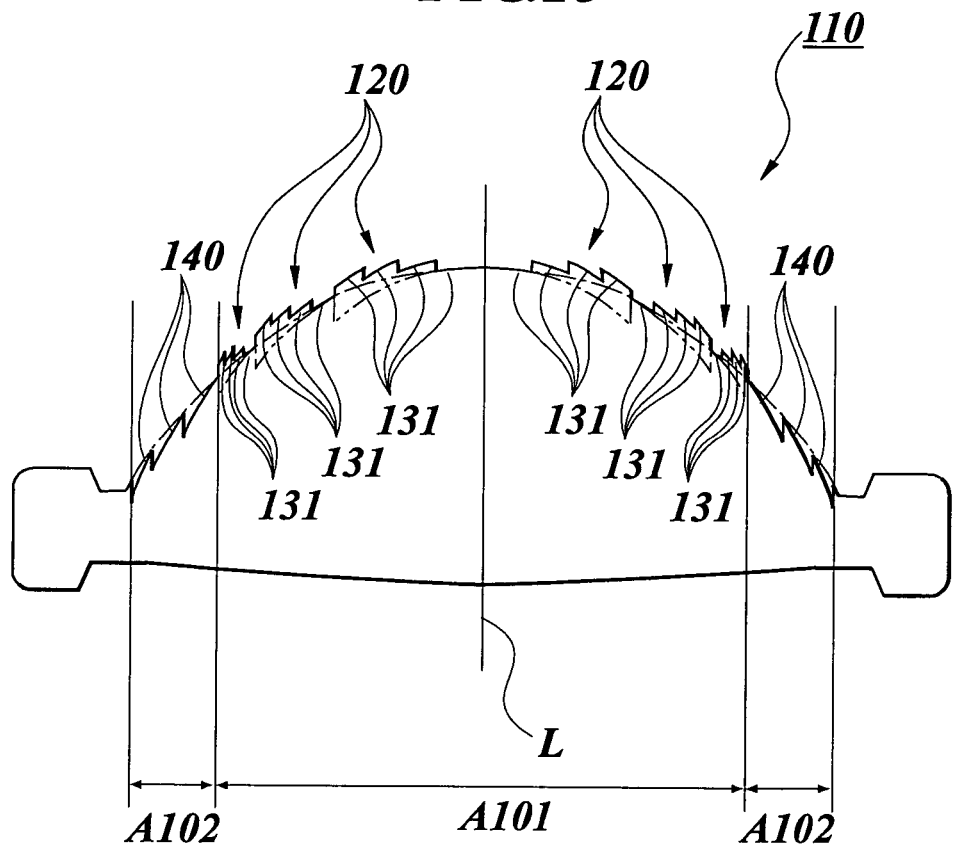
FIG. 15 is a side view showing the configuration of an objective lens.

The objective optical element according to the present invention is not limited to those of the Examples 1 to 3, and the objective optical element shown in FIG. 14 or FIG. 15 is applicable.

As compared with the objective optical elements of the Examples 1 and 2, the objective optical element shown in FIG. 14 comprises a plurality of diffracting ring-shaped zones 120 and an optical path difference giving structure 130 in the central region A101 on one optical surface 110a of the objective lens 110 (on the light source side) acting as an objective optical element of a single lens with two aspherical surfaces. The peripheral region A102 on the optical surface 110a of the objective lens 110 functions as a normal diffractive lens in the same manner as those in the Examples 1 and 2. However, in each diffracting ring-shaped zone 120, the farther the step 131 is away from the optical axis L, the more the step 131 is protruded toward the optical information recording medium. That is, the farther the step 131 is away from the optical axis L, the deeper the step 131 is fallen in the inside of the objective lens 110.

As compared with the objective optical elements of the Examples 1 and 2, the objective optical element shown in FIG. 15 comprises the diffracting ring-shaped zones 120 and the optical path difference giving structure 130 in the central region A101 on the optical surface 110a of the objective lens 110 (on the light source side) acting as an objective optical element of a single lens with two aspherical surfaces, in the same manner as those in the Examples 1 and 2. However, the objective optical element shown in FIG. 15 further comprises a plurality of diffracting ring-shaped zones 140 formed in a serrate shape in the peripheral region A102.

Figure 12:
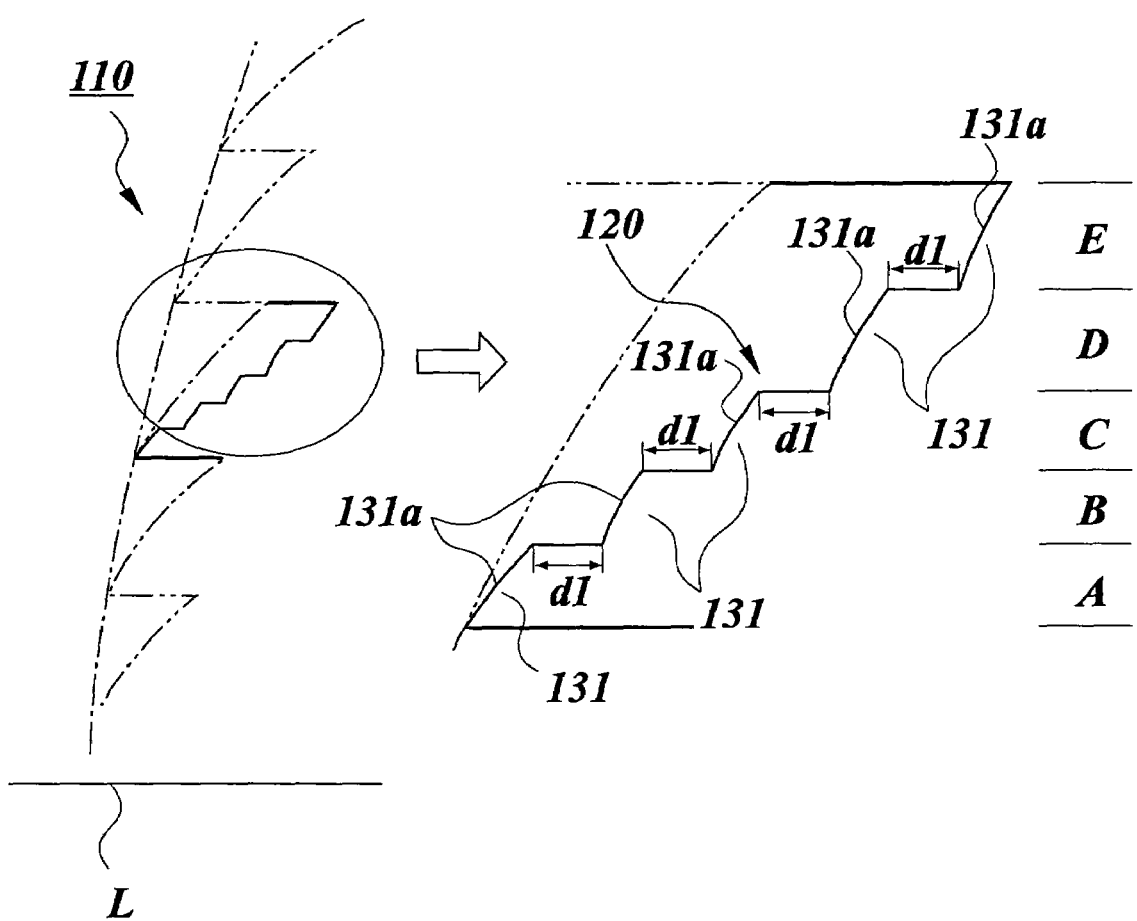
FIG. 12A is a side view of the objective lens.
FIG. 12B is an enlarged view of a part indicated by a circle in FIG. 12A.
Figure 17:
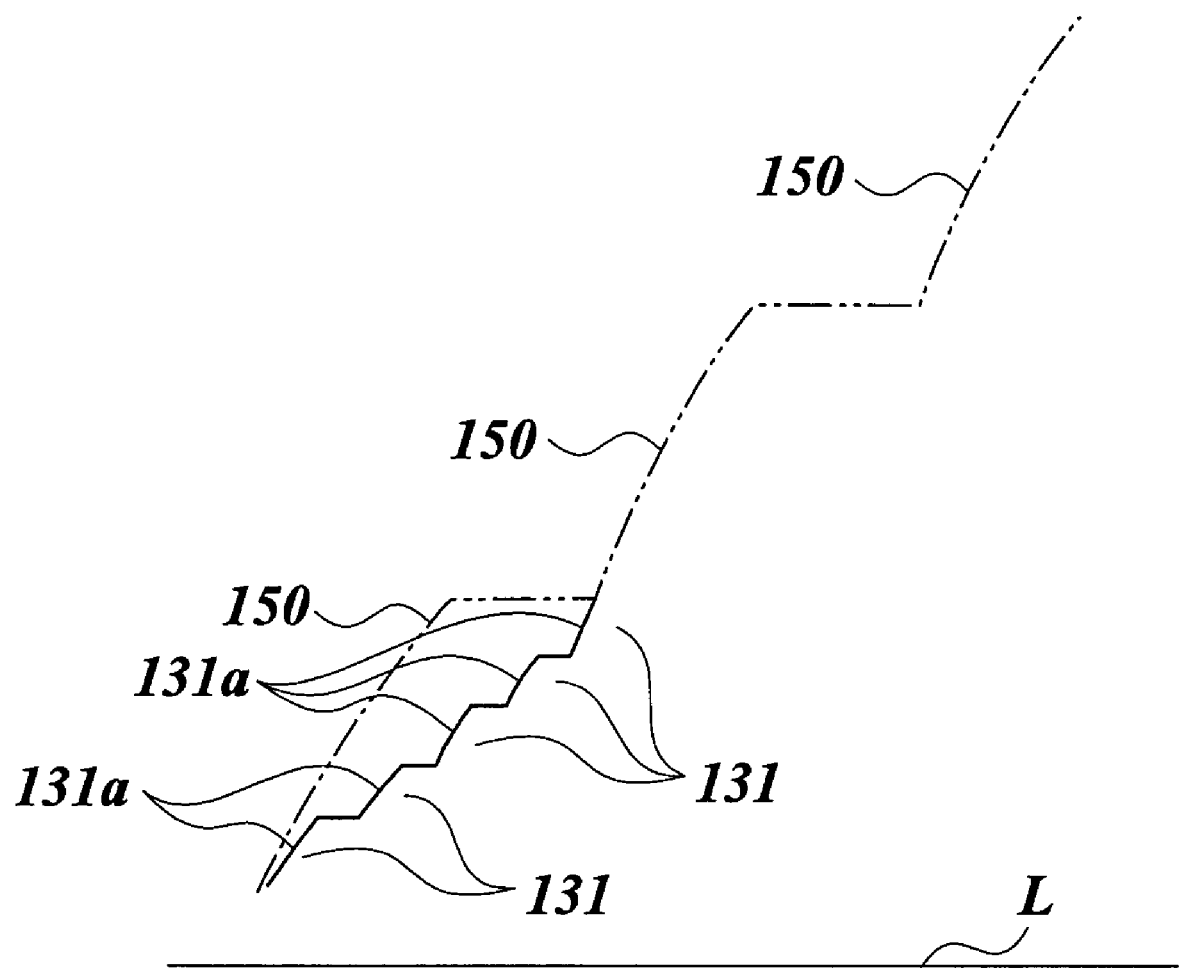
FIG. 17 is an enlarged side view showing the configuration of an objective lens.

Further, in the objective lens 110 shown in FIG. 12, a shape of surfaces 131a of the steps 131 is approximately obtained by dividing the surface shape of each diffracting ring-shaped zone 120 at intervals corresponding to the steps 131 and moving the divided ones in the direction of the optical axis L. However, the present invention is not limited to this. For example, an optical path difference giving structure shown in FIG. 17 is applicable. In detail, surfaces of a plurality of diffracting ring-shaped zones are defined by a discontinuous surface 50 formed in a stepped shape along the direction of the optical axis, the discontinuous surface 150 is divided at intervals corresponding to steps 131, and each divided surface is moved in the direction of the optical axis L to form surfaces 131a of the steps 131. The steps 131 have the function for giving the optical path difference.

As described above, in the objective optical element according to the present invention, the plurality of diffracting ring-shaped zones arranged around the optical axis are formed at least on a part of the optical functional surface formed in the aspherical shape, and the optical path difference giving structure having the stepped discontinuous surface is formed on the optical surfaces of the diffracting ring-shaped zones so as to give a prescribed optical path difference for light beams passing through the steps of each diffracting ring-shaped zone.

According to the embodiment, because the diffraction order of the light beam having each wavelength can be substantially changed by two stages of the diffracting ring-shaped zones of the objective optical element and the optical path difference giving structure, diffracted light having a sufficient amount of light corresponding to each type of the optical information recording medium can be obtained by appropriately changing the diffraction order of each light beam. Further, the degree of freedom in the design for the diffraction efficiency or the diffraction order can be increased.

The entire disclosure of Japanese Patent Applications No. Tokugan 2002-287268 filed on Sep. 30, 2002, No. Tokugan 2002-291399 filed on Oct. 3, 2002, No. Tokugan 2002-323414 filed on Nov. 7, 2002 and No. Tokugan 2002-323418 filed on Nov. 7, 2002 including specification, claims, drawings and summary are incorporated herein by reference in its entirety.

What is claimed is:

1. An optical element of an optical pickup device for at least one of reproducing and recording information on a first optical information recording medium having a protect substrate thickness t1 by using a light beam having a first wavelength $\lambda 1$ emitted from a first light source, and for at least one of reproducing and recording information on a second optical information recording medium having a protect substrate thickness t2 (t2≧t1) by using a light beam having a second wavelength $\lambda 2$ ($\lambda 2 > \lambda 1$) emitted from a second light source, comprising:

an optical surface comprising a central region arranged around the optical axis and formed in an approximately circular shape, and a peripheral region arranged at a periphery of the central region;

a diffractive structure having a plurality of diffracting ring-shaped zones arranged around an optical axis on at least one optical surface, the diffractive structure being provided in the central region; and an optical path difference giving structure for giving a prescribed optical path difference to a prescribed light beam passing through the diffracting ring-shaped zones, the optical path difference giving structure being provided in the central region, wherein the first wavelength $\lambda 1$ satisfies:

370 nm<$\lambda 1$<430 nm, wherein the diffractive structure emits an L-th (L≠0) order diffracted light with a larger light amount than any other diffractive light, when the light beam having the first wavelength $\lambda 1$ passes through the diffractive structure, which emits an M-th (M≠0) order diffracted light with a larger light amount than any other diffractive light, when the light beam having the second wavelength $\lambda 2$ passes through the diffractive structure, and wherein the optical path difference giving structure is superimposed on the diffractive structure so that at least one stepped shape of the optical path difference giving structure is disposed on the optical surfaces of each of the plurality of diffracting ring-shaped zones.

2. The optical element of claim 1, wherein as compared with the diffractive structure when the optical path difference giving structure is not provided on the optical surface of the diffractive structure, the optical path difference giving structure lowers an absolute value of an optical phase difference between the L-th order diffracted light of the light beam having the first wavelength $\lambda 1$ and the M-th order diffracted light of the light beam having the second wavelength $\lambda 2$ by changing a phase of at least one of the L-th order diffracted light of the light beam having the first wavelength $\lambda 1$ and the M-th order diffracted light of the light beam having the second wavelength $\lambda 2$, the L-th order diffracted light and the M-th order diffracted light being caused by the diffractive structure.

3. The optical element of claim 1, wherein as compared with the diffractive structure when the optical path difference giving structure is not provided on the optical surface of the diffractive structure, the optical path difference giving structure lowers an absolute value of an optical phase difference between the L-th order diffracted light of the light beam having the first wavelength $\lambda 1$ and the M-th order diffracted light of the light beam having the second wavelength $\lambda 2$ by substantially giving no change of a phase of one of the L-th order diffracted light of the light beam having the first wavelength $\lambda 1$ and the M-th order diffracted light of the light beam having the second wavelength $\lambda 2$ and by giving a phase difference to the other of the L-th order diffracted light of the light beam having the first wavelength $\lambda 1$ and the M-th order diffracted light having the light beam having the second wavelength $\lambda 2$, the L-th order diffracted light and the M-th order diffracted light being caused by the diffractive structure.

4. The optical element of claim 1, wherein as compared with the diffractive structure when the optical path difference giving structure is not provided on the optical surface of the diffractive structure, the optical path difference giving structure lowers an absolute value of an optical phase difference between the L-th order diffracted light of the light beam having the first wavelength $\lambda 1$ and the M-th order diffracted light of the light beam having the second wavelength $\lambda 2$ by giving a phase difference to both the L-th order diffracted light of the light beam having the first wavelength $\lambda 1$ and the M-th order diffracted light of the light beam having the second wavelength λ2, the L-th order diffracted light and the M-th order diffracted light being caused by the diffractive structure.

5. The optical element of claim 1, wherein as compared with the diffractive structure when the optical path difference giving structure is not provided on the optical surface of the diffractive structure, the optical path difference giving structure lowers an absolute value of an optical phase difference between the L-th order diffracted light of the light beam having the first wavelength λ1 and the M-th order diffracted light of the light beam having the second wavelength λ2 by giving an optical path difference approximately equal to an integral multiple having the first wavelength λ1 to the L-th order diffracted light of the light beam having the first wavelength λ1 to substantially give no change of a phase difference generated by the diffractive structure and by giving an optical path difference not equal to an integral multiple having the second wavelength λ2 to the M-th order diffracted light of the light beam having the second wavelength λ2.

6. The optical element of claim 1, wherein the optical path difference giving structure sets the absolute value of the optical phase difference to a value lower than 0.6π radians.

7. The optical element of claim 1, wherein the diffractive structure is a serrate shape, and the optical path difference giving structure is a stepped shape.

8. The optical element of claim 1, wherein the diffractive structure is a stepped shape, and the optical path difference giving structure is a stepped shape.

9. The optical element of claim 1, wherein a diffractive structure formed in a serrate shape is provided in the peripheral region.

10. The optical element of claim 1, wherein an optical path difference giving structure is provided in the peripheral region.

11. The optical element of claim 1, wherein a refractive structure for refracting a light beam is arranged in the peripheral region.

12. The optical element of claim 1, wherein L=M is satisfied.

13. The optical element of claim 1, wherein L=M=1 is satisfied.

14. The optical element of claim 7, wherein the number of the discontinuous surfaces which are formed in a stepped shape along a direction of the optical axis and composes the optical path difference giving structure, is 2 or 3.

15. The optical element of claim 1, wherein the second wavelength λ2 satisfies:

620 nm<λ2<680 nm.

16. The optical element of claim 1, wherein the diffractive structure sets a sum of a diffraction efficiency of the L-th order diffracted light of the light beam having the first wavelength λ1 and a diffraction efficiency of the M-th order diffracted light of the light beam having the second wavelength λ2 to 170% or less, and the optical path difference giving structure heightens the sum of the diffraction efficiency of the L-th order diffracted light of the light beam having the first wavelength λ1 and the diffraction efficiency of the M-th order diffracted light of the light beam having the second wavelength λ2 by 10% or more.

17. The optical element of claim 1, wherein the optical path difference giving structure gives an optical path difference to the diffracted light so that a –N-th order diffracted light of the light beam having the first wavelength λ1 has a maximum diffraction efficiency and so that a (–N+1)-th order diffracted light of the light beam having the second wavelength λ2 or a (–N–1)-th order diffracted light of the light beam having the second wavelength λ2 has a maximum diffraction efficiency.

18. The optical element of claim 1, wherein the number of diffracting ring-shaped zones is from 3 to 20.

19. The optical element of claim 1, wherein the optical path difference giving structure gives an optical path difference equal to an integral multiple of the second wavelength λ2 to the light beam having the second wavelength λ2.

20. The optical element of claim 1, wherein the optical element is an objective optical element.

21. The optical element of claim 17, wherein L=M is satisfied.

22. The optical element of claim 17, wherein L=N is satisfied.

23. The optical element of claim 17, wherein M=N is satisfied.

24. The optical element of claim 17, wherein L=M=N is satisfied.

25. The optical element of claim 17, wherein the light beam having the first wavelength λ1 and the light beam having the second wavelength λ2 are respectively incident on the optical surface as a diverging light beam, and the light beam having the first wavelength λ1 and the light beam having the second wavelength λ2 are converged on a prescribed optical information recording medium in a condition that at least one of a spherical aberration and a wave front aberration are corrected.

26. An optical pickup device for at least one of reproducing and recording information on a first optical information recording medium having a protect substrate thickness t1 by using a light beam having a first wavelength λ1 emitted from a first light source, and for at least one of reproducing and recording information on a second optical information recording medium having a protect substrate thickness t2 (t2≧t1) by using a light beam having a second wavelength λ2 (λ2>λ1) emitted from a second light source, the optical pickup device comprising:

a plurality of optical elements;
wherein at least one of the optical elements comprises:
an optical surface comprising a central region arranged around the optical axis and formed in an approximately circular shape, and a peripheral region arranged at a periphery of the central region;
a diffractive structure having a plurality of diffracting ring-shaped zones arranged around an optical axis on at least an optical surface, the diffractive structure being provided in the central region; and
an optical path difference giving structure for giving a prescribed optical path difference to a prescribed light beam passing through the diffracting ring-shaped zones, the optical path difference giving structure being provided in the central region,
wherein the first wavelength λ1 satisfies:

370 nm≦λ1≦430 nm, wherein the diffractive structure emits an L-th (L≠0) order diffracted light with a larger light amount than any other diffractive light, when the light beam having the first wavelength λ1 passes through the diffractive structure, which emits an M-th (M≠0) order diffracted light with a larger light amount than any other diffractive light, when the light beam having the second wavelength λ2 passes through the diffractive structure, and
wherein the optical path difference giving structure is superimposed on the diffractive structure so that at least one stepped shape of the optical path difference giving structure is disposed on the optical surfaces of each of the plurality of diffracting ring-shaped zones.

27. The optical pickup device of claim 26, wherein as compared with the diffractive structure when the optical path difference giving structure is not provided on the optical surface of the diffractive structure, the optical path difference giving structure lowers an absolute value of an optical phase difference between the L-th order diffracted light of the light beam having the first wavelength $\lambda 1$ and the M-th order diffracted light of the light beam having the second wavelength $\lambda 2$ by changing a phase of at least one of the L-th order diffracted light of the light beam having the first wavelength $\lambda 1$ and the M-th order diffracted light of the light beam having the second wavelength $\lambda 2$, the L-th order diffracted light and the M-th order diffracted light being caused by the diffractive structure.

28. The optical pickup device of claim 27, wherein information is at least one of reproduced and recorded for a third optical information recording medium having a protect substrate thickness t3 (t3>t2) by using a light beam having a third wavelength $\lambda 3$ ($\lambda 3>\lambda 2$) emitted from a third light source.

29. The optical pickup device of claim 26, wherein the optical path difference giving structure gives an optical path difference to the diffracted light so that a −N-th order diffracted light of the light beam having the first wavelength $\lambda 1$ has a maximum diffraction efficiency and so that a (−N +1)-th order diffracted light of the light beam having the second wavelength $\lambda 2$ or a (−N−1)-th order diffracted light of the light beam having the second wavelength $\lambda 2$ has a maximum diffraction efficiency.

30. The optical pickup device of claim 29, wherein information is at least one of reproduced and recorded for a third optical information recording medium having a protect substrate thickness t3 (t3>t2) by using a light beam having a third wavelength $\lambda 3$ ($\lambda 3>\lambda 2$) emitted from a third light source.

* * * * *

UNITED STATES PATENT AND TRADEMARK OFFICE
CERTIFICATE OF CORRECTION

PATENT NO.       : 7,636,290 B2                                                Page 1 of 1
APPLICATION NO.  : 10/666518
DATED            : December 22, 2009
INVENTOR(S)      : Mimori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 371 days.

Signed and Sealed this

Ninth Day of November, 2010

David J. Kappos
*Director of the United States Patent and Trademark Office*